US012586473B2

(12) United States Patent
Ramírez Blanco et al.

(10) Patent No.: US 12,586,473 B2
(45) Date of Patent: Mar. 24, 2026

(54) SYSTEM AND METHOD TO BUILD A FLYABLE HOLDING PATTERN ENTRY TRAJECTORY WHEN THE AVAILABLE SPACE IS LIMITED

(71) Applicant: THE BOEING COMPANY, Arlington, VA (US)

(72) Inventors: Salvador Ramírez Blanco, Madrid (ES); Daniel Miguel Hernández, Madrid (ES); Carlos Querejeta Masaveu, Madrid (ES); Sergio Villanueva Melero, Madrid (ES)

(73) Assignee: The Boeing Company, Arlington, VA (US)

(*) Notice: Subject to any disclaimer, the term of this patent is extended or adjusted under 35 U.S.C. 154(b) by 189 days.

(21) Appl. No.: 18/463,190

(22) Filed: Sep. 7, 2023

(65) Prior Publication Data

US 2025/0087100 A1 Mar. 13, 2025

(51) Int. Cl.

| | |
|---|---|
| ***G08G 5/34*** | (2025.01) |
| ***G08G 5/21*** | (2025.01) |
| ***G08G 5/26*** | (2025.01) |

(52) U.S. Cl.

CPC ................. *G08G 5/34* (2025.01); *G08G 5/21* (2025.01); *G08G 5/26* (2025.01)

(58) Field of Classification Search

None

See application file for complete search history.

(56) References Cited

U.S. PATENT DOCUMENTS

| | | | | |
|---|---|---|---|---|
| 7,003,383 | B2 * | 2/2006 | Rumbo | G05D 1/0202 701/410 |
| 10,867,520 | B2 * | 12/2020 | Heiberg | B64C 13/18 |
| 2004/0230351 | A1 | 11/2004 | Rumbo et al. | |
| 2005/0004745 | A1 | 1/2005 | Rumbo et al. | |
| 2020/0058225 | A1 | 2/2020 | Heiberg et al. | |

OTHER PUBLICATIONS

European Patent Office, Extended European Search Report Issued in Application No. 24182617.1, Dec. 10, 2024, Germany, 11 pages.

* cited by examiner

*Primary Examiner* — Jason Holloway
*Assistant Examiner* — Atticus A Cameron
(74) *Attorney, Agent, or Firm* — Alleman Hall LLP

(57) ABSTRACT

A technique for building a modified entry trajectory profile for an aircraft to join a holding pattern at an entry waypoint despite the airspace available to build the entry trajectory being limited. In one aspect, instructions are received for an aircraft to join a holding pattern at an entry waypoint according to an entry trajectory profile. An airspace around the holding pattern is divided into sectors using the entry waypoint as a reference point. A discontinuity in the entry trajectory profile can be identified. In response to identifying the discontinuity in the entry trajectory profile, a modified entry trajectory profile can be built by i) determining the sector from which the aircraft would approach the entry waypoint with a current track angle of the aircraft moved to intersect the entry waypoint and with the aircraft pointing at the entry waypoint; and ii) generating the modified entry trajectory profile.

20 Claims, 9 Drawing Sheets

SYSTEM AND METHOD TO BUILD A FLYABLE HOLDING PATTERN ENTRY TRAJECTORY WHEN THE AVAILABLE SPACE IS LIMITED

FIELD

Aspects of the present disclosure relate to building an entry trajectory profile for an aircraft to enter a holding pattern.

BACKGROUND

An aircraft can include a Flight Management System (FMS) that generates a trajectory profile for the aircraft based on a flight plan. The trajectory profile can include a lateral trajectory of holding patterns. The flight crew can select a lateral navigation mode on a Flight Control System (FCS) of the aircraft to fly the aircraft along the lateral trajectory computed by the FMS. In order to join the flight plan to a holding pattern, an entry trajectory profile is built. In some instances, the space available to build the entry trajectory profile is insufficient, which leads to the FMS building a discontinuous and unflyable trajectory to enter the holding pattern. This can force the flight crew to intervene. For instance, the flight crew may be forced to either modify the flight plan or discontinue the use of the lateral guidance provided by the FMS. This can cause confusion and an increase in the workload for the flight crew, which can be especially problematic when operating in terminal areas with dense traffic or in proximity to terrain surrounding the aircraft. Accordingly, there is a need for a technique for building a continuous and flyable entry trajectory profile to safely and efficiently transition an aircraft into a holding pattern, particularly when the airspace to build the entry trajectory profile is limited.

SUMMARY

The present disclosure provides a method in one aspect, the method includes: building a modified entry trajectory profile for an aircraft to join a holding pattern at an entry waypoint, an airspace around the holding pattern is divided into a plurality of sectors using the entry waypoint as a reference point. An inbound course of the holding pattern can be used as a reference direction. The modified entry trajectory profile is built by: determining a sector from the plurality of sectors from which the aircraft would approach the entry waypoint with a current track angle of the aircraft moved to intersect the entry waypoint and with the aircraft pointing at the entry waypoint; and generating the modified entry trajectory profile based at least in part on the sector determined.

In one aspect, in combination with any example aspect provided above or below, the method includes receiving instructions for the aircraft to join the holding pattern at the entry waypoint according to an entry trajectory profile; and identifying a discontinuity in the entry trajectory profile, and wherein the modified entry trajectory profile is built in response to identifying the discontinuity in the entry trajectory profile, the modified entry trajectory profile is built so that at least one aspect of the entry trajectory profile is changed.

In one aspect, in combination with any example aspect provided above or below, the modified entry trajectory profile is generated so as to intersect the entry waypoint a single time with a last segment of the modified entry trajectory.

In one aspect, in combination with any example aspect provided above or below, the sector is determined independent of a sector of the plurality of sectors in which the aircraft is physically located.

In one aspect, in combination with any example aspect provided above or below, determining the sector from the plurality of sectors includes: translating the current track angle to the entry waypoint so as to render a translated track angle, the translated track angle intersects the entry waypoint and the aircraft points at the entry waypoint; and determining a course change angle based at least in part on the translated track angle and an inbound course of the holding pattern or an inbound reference line thereof, and wherein the sector is determined based at least in part on the course change angle.

In one aspect, in combination with any example aspect provided above or below, the sector is determined by correlating the course change angle to one of a plurality of predefined angle ranges, each predefined angle range of the plurality of predefined angles ranges corresponds to one of the plurality of sectors.

In one aspect, in combination with any example aspect provided above or below, when the sector is determined as a first sector of the plurality of sectors, the modified entry trajectory profile is generated so that: i) a capture of the holding pattern is made at an inbound course of the holding pattern in a direction opposite to an inbound direction; and ii) a tear drop pattern is created that ends at the entry waypoint.

In one aspect, in combination with any example aspect provided above or below, the sector is determined as a first sector of the plurality of sectors, and wherein the method further includes: determining whether a capture of the holding pattern would be past a starting point of an inbound course of the holding pattern or a length of the inbound course of the holding pattern is shorter than two times a turn radius of turns of the holding pattern, and wherein when the capture of the holding pattern would be past the starting point of the inbound course of the holding pattern or the length of the inbound course of the holding pattern is shorter than two times the turn radius of the turns of the holding pattern, the modified entry trajectory profile is generated so that: i) a capture is made past the starting point of the inbound course at an inbound reference line, which extends from and is coaxial with the inbound course, and in a direction opposite to an inbound direction; and ii) a tear drop pattern is created having a tear drop arc built beyond a turn-to-inbound course of the holding pattern, and the tear drop ends at the entry waypoint.

In one aspect, in combination with any example aspect provided above or below, when the sector is determined as a second, third, or fourth sector of the plurality of sectors, the modified entry trajectory profile is generated so that: i) a capture of the holding pattern is made at an outbound course of the holding pattern in a direction with an outbound direction; and ii) a following pattern is created that follows the holding pattern and ends at the entry waypoint.

In one aspect, in combination with any example aspect provided above or below, the modified entry trajectory profile is generated so that, prior to the capture of the holding pattern at the outbound course, a segment of the modified entry trajectory profile crosses the outbound course.

In one aspect, in combination with any example aspect provided above or below, the sector is determined as a second, third, or fourth sector of the plurality of sectors, and wherein the method further includes: determining whether a capture of the holding pattern would be past an ending point of an outbound course of the holding pattern, and wherein when the capture of the holding pattern would be past the ending point of the outbound course of the holding pattern, the modified entry trajectory profile is generated so that: i) a capture is made past the ending point of the outbound course at an outbound reference line, which extends from and is coaxial with the outbound course, and in a direction with an outbound direction; and ii) an extended following pattern is built having an arc segment and an inbound segment, the arc segment is built beyond a turn-to-inbound course of the holding pattern, and the inbound segment ends at the entry waypoint.

In one aspect, in combination with any example aspect provided above or below, the method includes causing the aircraft to join the holding pattern at the entry waypoint by flying according to the modified entry trajectory profile.

In one aspect, in combination with any example aspect provided above or below, wherein building the modified entry trajectory profile further includes: determining a build construction based at least in part on the sector determined, the build construction being determined from one of a plurality of possible build constructions, and wherein the modified entry trajectory profile is built in accordance with the build construction.

In one aspect, in combination with any example aspect provided above or below, the method further includes determining an implementation scheme for the build construction, the implementation scheme being determined from one of a plurality of possible implementation schemes that includes at least a normal capture implementation and an extended capture implementation.

In a further aspect, a non-transitory, computer readable medium including instructions that, when executed by one or more processors, cause the one or more processors to perform an operation, the operation including: building a modified entry trajectory profile for an aircraft to join a holding pattern at an entry waypoint, an airspace around the holding pattern is divided into a plurality of sectors using the entry waypoint as a reference point, the modified entry trajectory profile is built by: determining a sector from the plurality of sectors from which the aircraft would approach the entry waypoint with a current track angle of the aircraft moved to intersect the entry waypoint and with the aircraft pointing at the entry waypoint; and generating the modified entry trajectory profile based at least in part on the sector determined.

In one aspect, in combination with any example aspect provided above or below, the operation further includes: receiving instructions for the aircraft to join the holding pattern at the entry waypoint according to an entry trajectory profile; and identifying a discontinuity in the entry trajectory profile, and wherein the modified entry trajectory profile is built in response to identifying the discontinuity in the entry trajectory profile, the modified entry trajectory profile is built so that at least one aspect of the entry trajectory profile is changed.

In one aspect, in combination with any example aspect provided above or below, determining the sector from the plurality of sectors includes: translating the current track angle to the entry waypoint so as to render a translated track angle, the translated track angle intersects the entry waypoint and the aircraft points at the entry waypoint; and determining a course change angle based at least in part on the translated track angle and an inbound course of the holding pattern, and wherein the sector is determined based at least in part on the course change angle.

In one aspect, in combination with any example aspect provided above or below, the plurality of sectors include a first sector, a second sector, a third sector, and a fourth sector, and wherein when the sector is determined as a first sector of the plurality of sectors, the modified entry trajectory profile is generated so that: i) a capture of the holding pattern is made at an inbound course of the holding pattern in a direction opposite to an inbound direction; and ii) a tear drop pattern is created that ends at the entry waypoint.

In one aspect, in combination with any example aspect provided above or below, wherein the plurality of sectors include a first sector, a second sector, a third sector, and a fourth sector, and wherein when the sector is determined as a second, third, or fourth sector of the plurality of sectors, the modified entry trajectory profile is generated so that: i) a capture of the holding pattern is made at an outbound course of the holding pattern in a direction with an outbound direction; and ii) a following pattern is created that follows the holding pattern and ends at the entry waypoint.

In yet a further aspect, an aircraft is provided. The aircraft includes a system having one or more processors and one or more memory devices that store a program executable by the one or more processors to perform an operation, the operation including: building a modified entry trajectory profile by: determining a sector from a plurality of sectors from which the aircraft would approach an entry waypoint of a holding pattern with a current track angle of the aircraft moved to intersect the entry waypoint and with the aircraft pointing at the entry waypoint; and generating the modified entry trajectory profile based at least in part on the sector determined.

BRIEF DESCRIPTION OF THE DRAWINGS

So that the manner in which the above recited features can be understood in detail, a more particular description, briefly summarized above, may be had by reference to example aspects, some of which are illustrated in the appended drawings.

DETAILED DESCRIPTION

Figure 1:
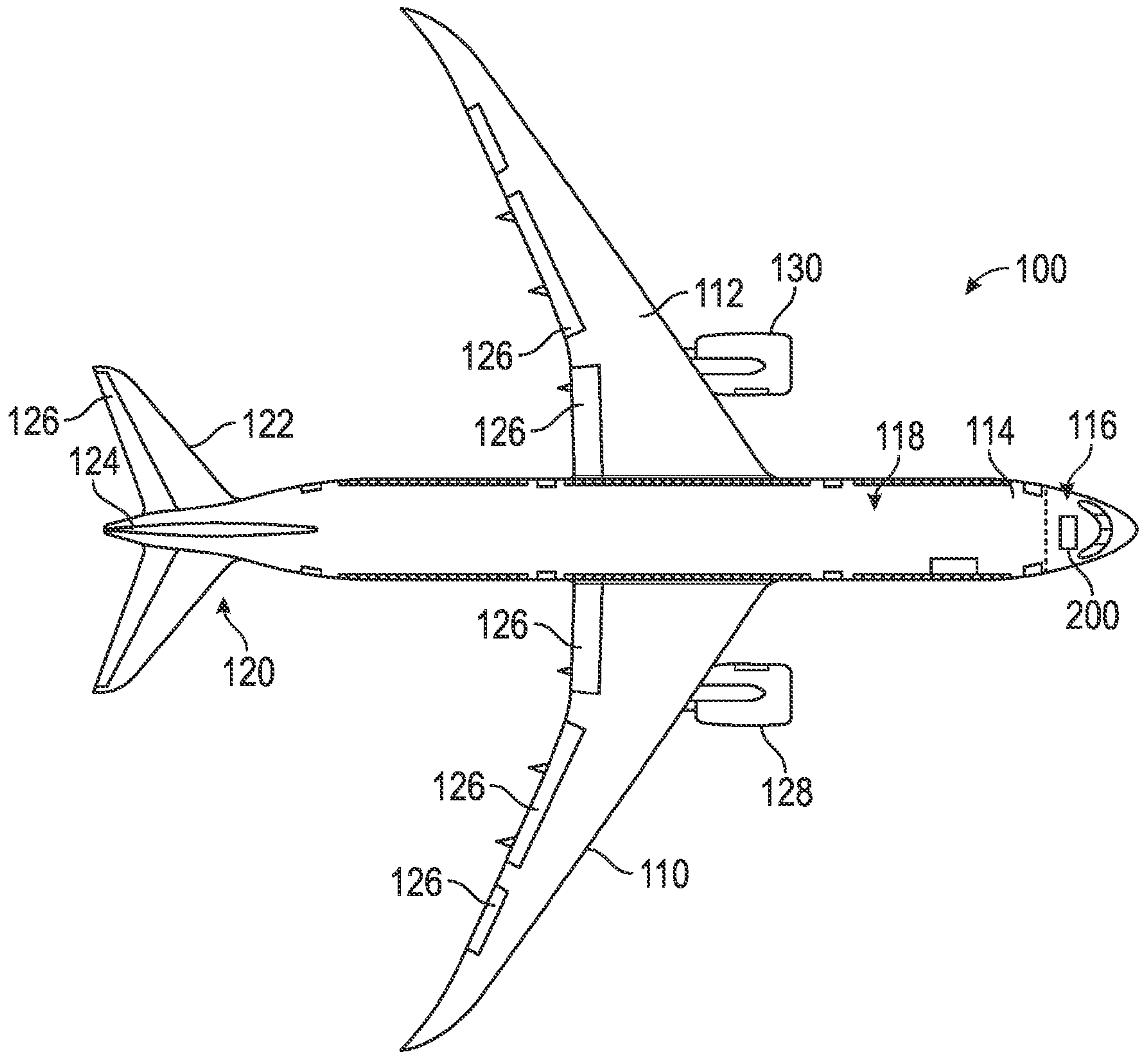
FIG. 1 is schematic top view of an aircraft according to example aspects of the present disclosure.

The present disclosure provides techniques for building a continuous and flyable entry trajectory profile to safely and efficiently transition an aircraft into a holding pattern, particularly when the airspace to build the entry trajectory profile is limited. For example, when an entry trajectory profile includes a discontinuity that makes it discontinuous and unflyable, the present disclosure provides a technique for building a modified entry trajectory profile to "bypass" the entry trajectory profile with the discontinuity. Unlike the entry trajectory profile, the modified entry trajectory profile provides a continuous and flyable entry trajectory to guide an aircraft into a holding pattern at an entry waypoint into the holding pattern. An airspace around the holding pattern can be divided into a plurality of sectors using an inbound reference line and the entry waypoint as a reference point. The inbound reference line extends along and/or from an inbound course of the holding pattern to provide a reference direction.

To summarize, in one example aspect, the modified entry trajectory profile can be built by determining a sector from which the aircraft would approach the entry waypoint if a current track angle of the aircraft was moved to intersect the entry waypoint and the aircraft (e.g., a nose thereof) was pointing at the entry waypoint. The sector is determined independent of the sector in which the aircraft is physically located. Based on the determined sector, a build construction can be determined. The build construction can be implemented according to an implementation scheme (e.g., a normal capture implementation or an extended capture implementation). The modified entry trajectory profile can be generated so that at least one aspect of the entry trajectory profile is changed. The modified entry trajectory profile can be built according to implementation scheme for the build construction, which is determined based on the determined sector. The aircraft can then transition to and enter the holding pattern using the modified entry trajectory profile.

The modified entry trajectory profile can provide a smooth, continuous, and flyable entry transition into a holding pattern. Generation or use of the modified entry trajectory profile can provide a number of advantages, benefits, and/or technical effects. For instance, advantageously, the modified entry trajectory profile can provide a flyable lateral trajectory that a flight control system can command the aircraft to follow without making the aircraft fly off-path. In addition, minimum flight crew intervention, if any, is needed to transition the aircraft into a holding pattern despite limited airspace, which avoids increasing the workload of the flight crew. Moreover, the modified entry trajectory profile follows the standard holding pattern entry rules as much as possible, and an annunciation to the flight crew can be provided indicating that part of the standard holding pattern entry trajectory is modified or bypassed due to the limited space available. Further, increased safety levels can be provided by improving the situational awareness of the flight crew and helping meet the airspace restrictions around the holding pattern.

FIG. 1 is schematic top view of an aircraft 100 according to example aspects of the present disclosure. The aircraft 100 includes a pair of wings 110, 112 and a fuselage 114. The wings 110, 112 extend laterally outward from the fuselage 114. An interior of the fuselage 114 can include a cockpit 116 and a cabin 118. The aircraft 100 also includes a tail section 120 having a horizontal stabilizer 122 and a vertical stabilizer 124. The wings 110, 112, the horizontal stabilizer 122, and the vertical stabilizer 124 can all include control surfaces 126 (e.g., ailerons, elevators, rudder, etc.) that can be controlled to maneuver the aircraft 100 during flight, such as according to a flight plan. The aircraft 100 further includes propulsion units 128, 130 mounted to respective wings 110, 112. In FIG. 1, the propulsion units 128, 130 are gas turbine engines configured as turbofans. However, in other example aspects, the propulsion units 128, 130 can be other types of propulsion units, such as electrically-driven fans.

The aircraft 100 can also include a system 200. In accordance with inventive aspects of the present disclosure, the system 200 is operable to dynamically modify an entry trajectory profile of the aircraft 100 during flight in response to identifying a discontinuity in the entry trajectory profile. Particularly, an entry trajectory profile can be built to provide a plan for joining a holding pattern at an entry waypoint. The entry trajectory profile can be built according to one or more standard entry trajectory profiles, for example. However, when a discontinuity in the entry trajectory profile is identified, e.g., due to insufficient available airspace, the system 200 can bypass the standard entry trajectory profile in favor of a modified entry trajectory profile. In this regard, the system 200 can dynamically generate a continuous and flyable entry transition to a holding pattern despite limited airspace. The system 200 is described in greater detail with respect to FIG. 2.

The aircraft 100 of FIG. 1 is provided for example purposes and is not intended to be limiting. The inventive aspects can apply to any type of aircraft or airship capable of flying in air traffic controlled airspace where holding patterns are used. In this regard, the inventive aspects of the present disclosure can apply to aircraft with any configuration of wings, tail, aerodynamic control surfaces, power plant, etc.

Figure 2:
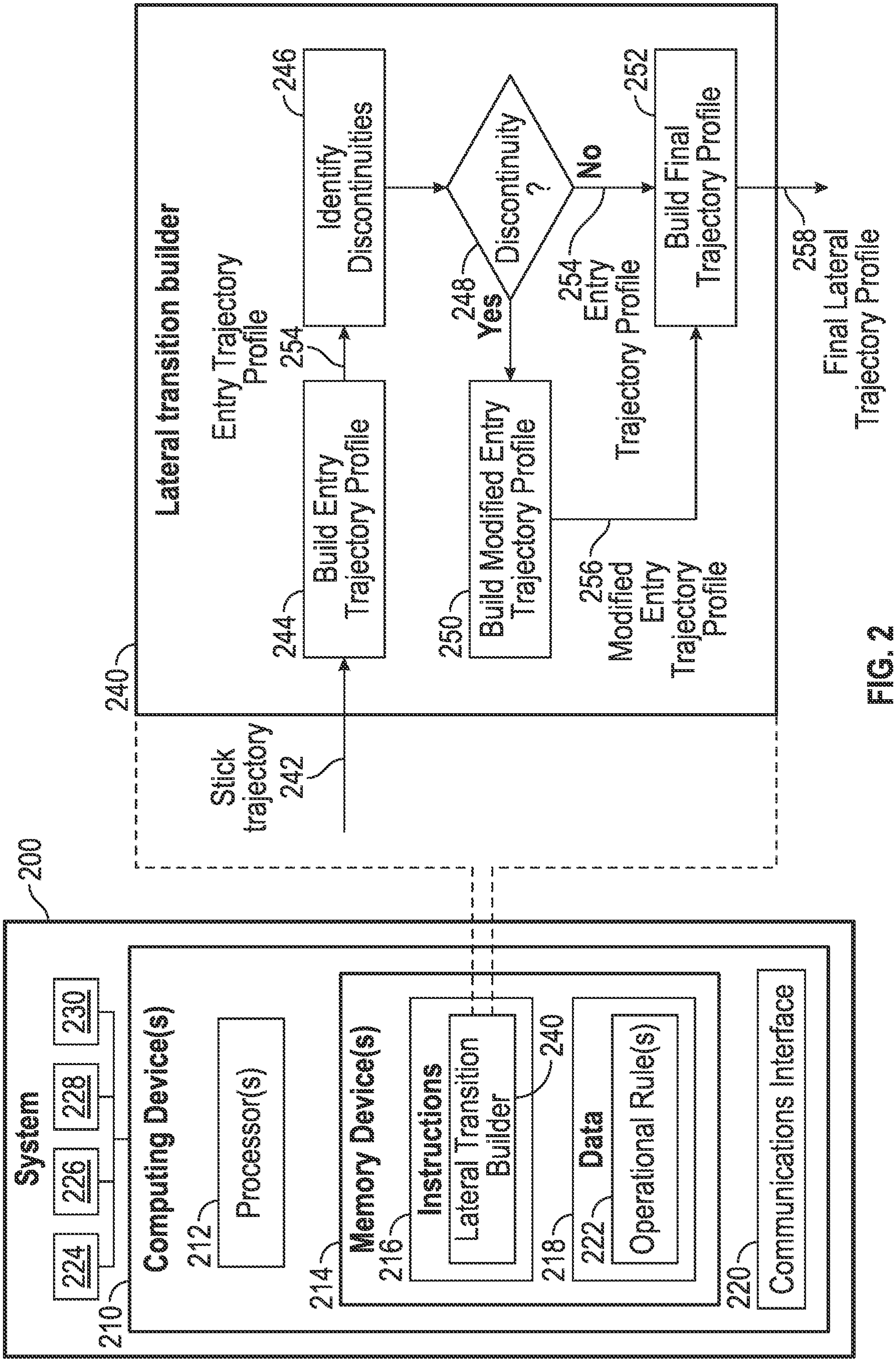
FIG. 2 is a diagram of a system of the aircraft of FIG. 1.

FIG. 2 is a diagram of the system 200 of FIG. 1. The system 200 can be a Flight Management System (FMS), for example. The system 200 includes one or more processors 212 and one or more memory devices 214 (e.g., one or more non-transitory memory devices), which can be embodied in one or more computing devices 210, such as a Flight Management Computer (FMC). The one or more memory devices 214 can include instructions 216, such as computer-readable instructions, that, when executed by the one or more processors 212, can cause the one or more processors 212 to perform one or more operations, such as generating entry trajectory profiles for transitioning an aircraft into a holding pattern, and if necessary, building a modified entry trajectory profile. The one or more memory devices 214 can also store data 218, such as operational rules 222, recorded flight data, lookup tables, etc.

The operational rules 222 can include rules or guidelines set forth in Radio Technical Commission for Aeronautics (RTCA) Document DO-236C, Appendix E, ARINC Specification 424, Federal Aviation Administration (FAA) guideline documents, Air Traffic Control instructions, rules specified by a manufacturer of the aircraft, rules specified by a government agency, user-entered rules, or a combination thereof. For instance, the operational rules 222 can set forth various constraints for turn radii at different aircraft speeds. As a non-limiting example, the operational rules 222 can indicate that a turn radius for an aircraft is to be computed such that the turn maneuver is coordinated (e.g., according to the coordinated turn equation). As another non-limiting example, the operational rules 222 can indicate that a turn radius for an aircraft is to be computed based on a constant minimum or maximum bank angle, and the current aircraft speed. Other examples are contemplated.

Further, the one or more computing devices 210 can include a communications interface 220 operable to transmit and/or receive communications to or from various associated systems and/or devices, such as over a communication bus. Example associated systems include, without limitation, an input interface 224 (e.g., a Control Display Unit (CDU)), one or more displays 226 (e.g., an Electronic Flight Instrument System (EFIS), Navigation Display (ND), and/or Multifunction Display (MFD)), one or more navigation systems 228 (e.g., Inertial Navigation System INS), Global Positioning System (GPS), altimeter, Air Data Computer (ADC), etc.), and/or one or more other systems 230 (e.g., an autopilot system, Flight Control System (FCS), Flight Data Recorder (FDR), etc.).

As shown in FIG. 2, the instructions 216 can include a lateral transition builder 240 that builds or generates lateral trajectory profiles, including entry trajectory profiles that provide a plan for transitioning an aircraft into a holding pattern. Generally, a flight plan, e.g., entered into the system 200 by the flight crew, can be converted into a stick trajectory 242, which is a sequence of straight and curved segments that may have course discontinuities between them. The lateral transition builder 240 creates lateral transitions between stick trajectory segments, including a lateral transition for an aircraft to enter into a holding pattern. Particularly, at block 244, the lateral transition builder 240 can build an entry trajectory profile 254 for transitioning an aircraft into a holding pattern. The entry trajectory profile 254 can be built in accordance with the one or more operational rules 222, such as the rules or guidelines set forth in RTCA Document DO-236C, Appendix E and/or ARINC Specification 424.

In some instances, one or more discontinuities in the entry trajectory profile 254 can result. Generally, a discontinuity in the entry trajectory profile 254 makes the entry trajectory profile 254 discontinuous and unflyable. At block 246, discontinuities in the entry trajectory profile 254 can be identified. Discontinuities can result when the space to build the entry trajectory is insufficient or limited. As one example, a flight plan is formed by legs in sequence. An entry to the holding pattern is located at an entry waypoint where the previous leg ends. When the previous leg's length is too short, and its course difference with respect to the inbound course of the holding pattern is large, there may not be enough space to build the entry transition. In such cases, one or more discontinuities in the entry trajectory profile 254 can result. As another example, when the present position of the airplane is close to the entry waypoint, and the flight crew enters a Direct-To command to the entry waypoint, there may not be enough space to build the entry transition. In such cases, one or more discontinuities in the entry trajectory profile 254 can result. As yet another example, when the present position of the airplane is close to the entry waypoint, and the flight crew engages the Lateral Navigation mode (LNAV) of the FCS, a lateral path capture can be built to the leg previous to the holding pattern, and in some instances, there may not be enough space to build the entry transition.

At block 248, a determination is made as to whether a discontinuity was identified at block 246. When no discontinuities are identified at block 246, the entry trajectory profile 254 built at block 244 is used to build a final lateral trajectory profile 258 at block 252. When one or more discontinuities are identified at block 246, the entry trajectory profile 254 is "bypassed" and a modified entry trajectory profile 256 is built at block 250 and used to build the final lateral trajectory profile 258 at block 252.

The modified entry trajectory profile 256 can provide a smooth, continuous, and flyable entry transition into a holding pattern. Generation of the modified entry trajectory profile 256 can provide a number of advantages and/or benefits. For instance, advantageously, the modified entry trajectory profile 256 can provide a flyable lateral trajectory that a FCS can command the aircraft to follow without making it fly off-path. Minimum flight crew intervention, if any, is needed to transition the aircraft into a holding pattern despite limited airspace, which avoids increasing the workload of the flight crew. Moreover, the modified entry trajectory profile 256 follows the standard holding pattern entry rules as much as possible, and an annunciation to the flight crew can be provided indicating that part of the standard holding pattern entry trajectory is modified or bypassed due to the limited space available. Further, increased safety levels can be provided by improving situational awareness, namely by showing the flight crew the actual entry trajectory profile 256 that the aircraft is going to fly, and helping meet the airspace restrictions around the holding pattern.

Building a Modified Entry Trajectory Profile

Example techniques for building the modified entry trajectory profile 256 are provided below.

Figure 3:
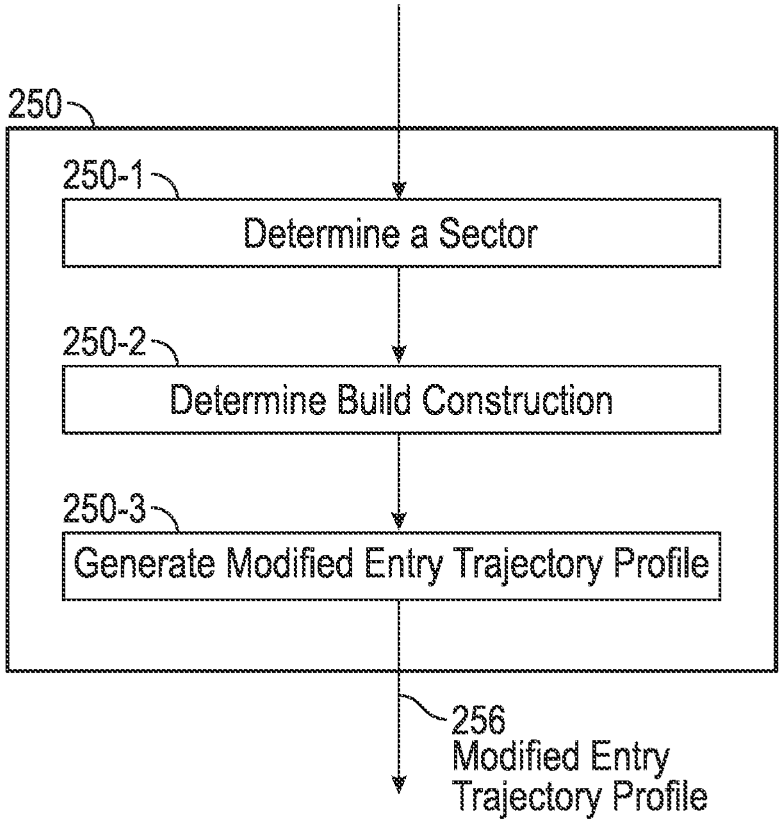
FIG. 3 is a flow diagram of an example technique for generating a modified entry trajectory profile using the system of FIG. 2.

FIG. 3 is a flow diagram of an example technique for generating the modified entry trajectory profile 256 at block 250 in FIG. 2. After determining that there is a discontinuity in the entry trajectory profile 254, e.g., at block 248 in FIG. 2, the modified entry trajectory profile 256 can be built at block 250.

At block 250-1, as depicted in FIG. 3, a sector can be determined, e.g., by the one or more processors 212 executing the lateral transition builder 240 (FIG. 2). That is, a sector from a plurality of sectors can be determined by identifying the sector from which the aircraft would approach the entry waypoint with a current track angle of the aircraft moved to intersect the entry waypoint and with the aircraft pointing at the entry waypoint.

Figure 4:
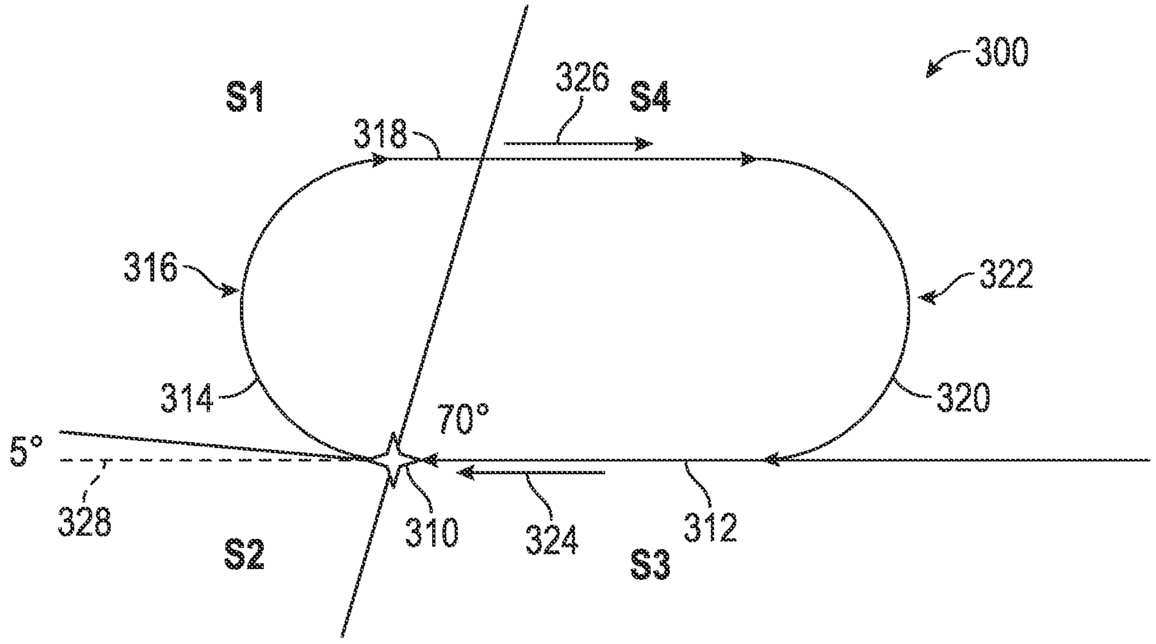
FIG. 4 is a diagram of an example holding pattern for an aircraft with the airspace around the holding pattern being divided into various sectors using an inbound reference line and an entry waypoint of the holding pattern as a reference point.

First, with reference to FIG. 4, an example manner in which an airspace around a holding pattern can be divided into different sectors will be provided. FIG. 4 depicts an example holding pattern 300 for an aircraft with the airspace being divided into various sectors using an entry waypoint 310 of the holding pattern 300 as a reference point. In this example, the holding pattern 300 has a predefined racetrack pattern that includes an inbound course 312, a first turn 314 (or a turn-to-outbound course) at a fix end 316 of the holding pattern 300, an outbound course 318, and a second turn 320

(or a turn-to-inbound course) at an outbound end 322 of the holding pattern 300. The inbound and outbound courses 312, 318 are straight segments and the first and second turns 314, 320 are curved segments and extend between and connect the respective ends of the inbound and outbound courses 312, 318 as shown in FIG. 4. The entry waypoint 310 is the start of the first turn 314 and the entry point of the holding pattern 300. An inbound direction 324 can be defined along the inbound course 312 and an outbound direction 326 can be defined along the outbound course 318 of the holding pattern 300. Using right-hand turns, an aircraft can fly the holding pattern 300, e.g., in waiting for landing due to traffic congestion, poor weather, runway unavailability, emergencies on the ground, etc. The holding pattern 300 can be defined with right-hand or left-hand turns. In case of a left-hand turn holding pattern, the construction is symmetric with respect to the axis defined by an inbound reference line 328.

The airspace around the holding pattern 300 is divided into a plurality of sectors using the entry waypoint 310 as a reference point. The sectors can include a first sector S1, a second sector S2, a third sector S3, and fourth sector S4. Generally, the first sector S1 is defined from five degrees to one hundred ten degrees (5° to 110°) with respect to the inbound reference line 328, which extends from and is coaxial with the inbound course 312 as shown in FIG. 4, the second sector S2 is defined from two hundred ninety degrees to five degrees (290° to 5°) with respect to the inbound reference line 328, the third sector S3 is defined from one hundred eighty degrees to two hundred ninety degrees (180° to 290°) with respect to the inbound reference line 328, and the fourth sector S4 is defined from one hundred ten degrees to one hundred eighty degrees (110° to 180°) with respect to the inbound reference line 328. The construction of such sectors is specified in the RTCA Document DO-236C, Appendix E.

Accordingly, at block 250-1, the sector is determined as one of the four sectors, or as the first sector S1, the second sector S2, the third sector S3, or the fourth sector S4. Determining the sector facilitates classification of the build construction to be implemented in building the modified entry trajectory profile 256.

Second, with the first, second, third, and fourth sectors S1, S2, S3, and S4 defined, the technique for determining the sector from which the aircraft would approach the entry waypoint with a current track angle of the aircraft moved to intersect the entry waypoint and with the aircraft pointing at the entry waypoint will now be provided.

Figure 5:
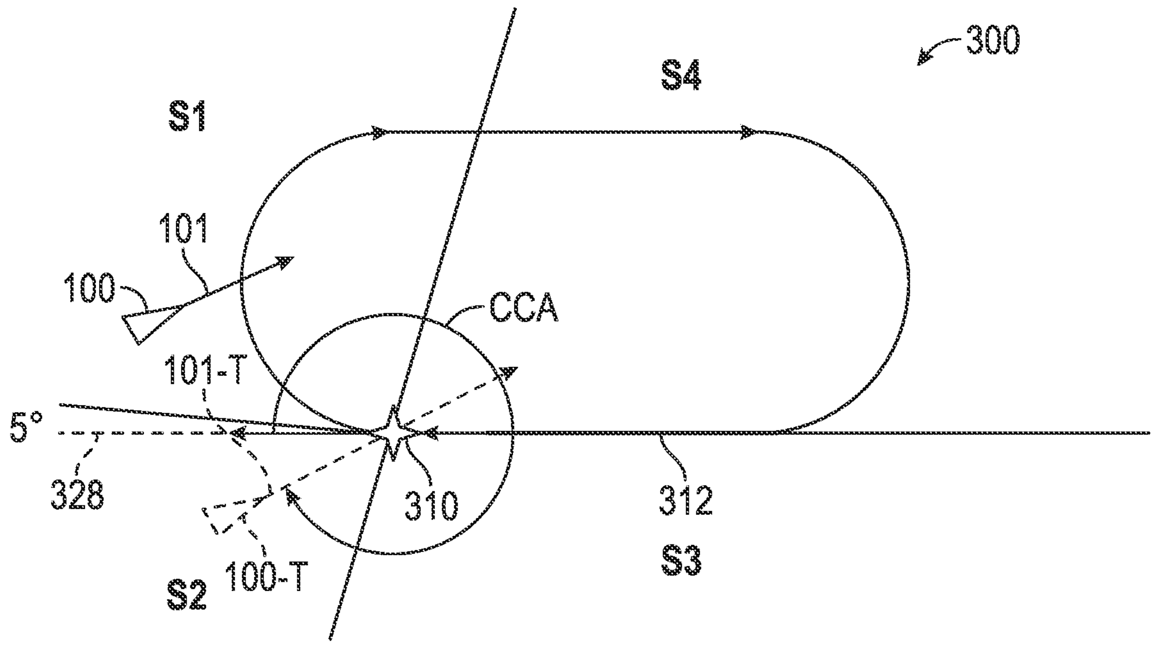
FIG. 5 is a diagram showing a technique for translating a current track angle of an aircraft to a translated track angle.

FIG. 5 depicts an example diagram showing a technique for translating a current track angle of an aircraft to a translated track angle. As shown in FIG. 5, the aircraft 100 (represented as a triangle) has a current track angle 101, or direction of motion in a horizontal plane. To determine the sector, the current track angle 101 is moved or translated to the entry waypoint 310 so as to render a translated track angle 101-T. The translated track angle 101-T intersects the entry waypoint 310 and the aircraft, or translated aircraft 100-T, points at the entry waypoint 310, e.g., as shown in FIG. 5. Accordingly, for the example of FIG. 5, the second sector S2 is the sector from which the aircraft 100 would approach the entry waypoint 310 if the current track angle 101 of the aircraft 100 is moved to intersect the entry waypoint 310 (i.e., moved to render the translated track angle 101-T) and with the aircraft (or translated aircraft 100-T) pointing at the entry waypoint 310. Notably, the second sector S2 is the determined sector in this example despite the aircraft 100 being currently physically located in the first sector S1. In this regard, the determination of the sector is determined independent of the sector in which the aircraft is physically located.

In some aspects, determining the sector from which the aircraft 100 would approach the entry waypoint 310 with the current track angle 101 of the aircraft 100 moved to intersect the entry waypoint 310 and with the aircraft, which has been moved as well, pointing at the entry waypoint 310 can be done using a course change angle. For instance, after translating the current track angle 101 to the entry waypoint 310 so as to render the translated track angle 101-T, which intersects the entry waypoint 310 and the aircraft points at the entry waypoint 310, a course change angle CCA can be determined based at least in part on the translated track angle 101-T and the inbound course 312 of the holding pattern 300. As shown in FIG. 5, for example, the course change angle CCA can be determined as an angle between the translated track angle 101-T and the inbound reference line 328, which extends from and is coaxial with the inbound course 312 as previously noted. In this example, the course change angle CCA is three hundred thirty-five degrees (335°). The sector can be determined based at least in part on the course change angle CCA.

For instance, the sector can be determined by correlating the course change angle CCA to one of a plurality of predefined angle ranges. Each predefined angle range can correspond to one of the plurality of sectors. For instance, the determined course change angle CCA can be determined and correlated to one of the predefined angle ranges set forth in a lookup table, such as Table 1 presented below. By way of example, the course change angle CCA determined in the example of FIG. 5 is three hundred thirty-five degrees (335°). Three hundred thirty-five degrees (335°) falls within the predefined angle range corresponding to the second sector S2. Thus, the second sector S2 can be determined as the sector from which the aircraft 100 would approach the entry waypoint 310 with the current track angle 101 of the aircraft 100 moved to intersect the entry waypoint 310 and with the aircraft (or translated aircraft 100-T) pointing at the entry waypoint 310.

TABLE 1

| Range | Sector |
|---|---|
| 5 deg ≤ CCA ≤ 110 deg | S1 |
| 290 deg ≤ CCA < 5 deg | S2 |
| 180 deg ≤ CCA < 290 deg | S3 |
| 110 deg < CCA < 180 deg | S4 |

In yet other aspects, determining the sector can be done using other techniques, such as by translating or moving the current track angle 101 of the aircraft 100 to intersect the entry waypoint 310 (i.e., moved to render the translated track angle 101-T) and with the aircraft (or translated aircraft 100-T) pointing at the entry waypoint 310, and then using recognition techniques to determine where the aircraft would be in such a translated position. For instance, in FIG. 5, recognition techniques can determine that the translated aircraft 100-T is positioned in the second sector S2.

At block 250-2, returning to FIG. 3, a build construction for generating the modified entry trajectory profile 256 can be determined based at least in part on the sector determined at block 250-1, e.g., by the one or more processors 212 executing the lateral transition builder 240 (FIG. 2). In some example aspects, at least two different types of build constructions are possible, including a first build construction (e.g., an inbound capture construction) and a second build construction (e.g., an outbound capture construction). In other example aspects, more than two build construction types are possible. One or more of the build construction types can be implemented according to at least two different implementation schemes. In some example aspects, for example, a first build construction can be implemented as a normal capture implementation or as an extended capture implementation and a second build construction can be implemented as a normal capture implementation or as an extended capture implementation. In this regard, the build construction types can have certain classes of implementation.

In some example aspects, at block 250-2 and with reference to FIGS. 3 and 4, when the sector is determined as the first sector S1, the build construction is determined as a first build construction (e.g., an inbound capture construction). When the sector is determined as the second sector S2, the third sector S3, or the fourth sector S4, the build construction is determined as a second build construction (e.g., an outbound capture construction). In this regard, the build construction used to generate the modified entry trajectory profile 256 can be determined based on the sector determined at block 250-1.

At block 250-3, the modified entry trajectory profile 256 can be generated based at least in part on the build construction determined at block 250-2, e.g., by the one or more processors 212 executing the lateral transition builder 240 (FIG. 2). The modified entry trajectory profile 256 generated at block 250-3 can then be used, e.g., to build the final lateral trajectory profile 258 as shown in FIG. 2. Example implementations of generating the modified entry trajectory profile 256 are provided below.

Sector 1—First Build Construction—Normal Capture

Figure 6:
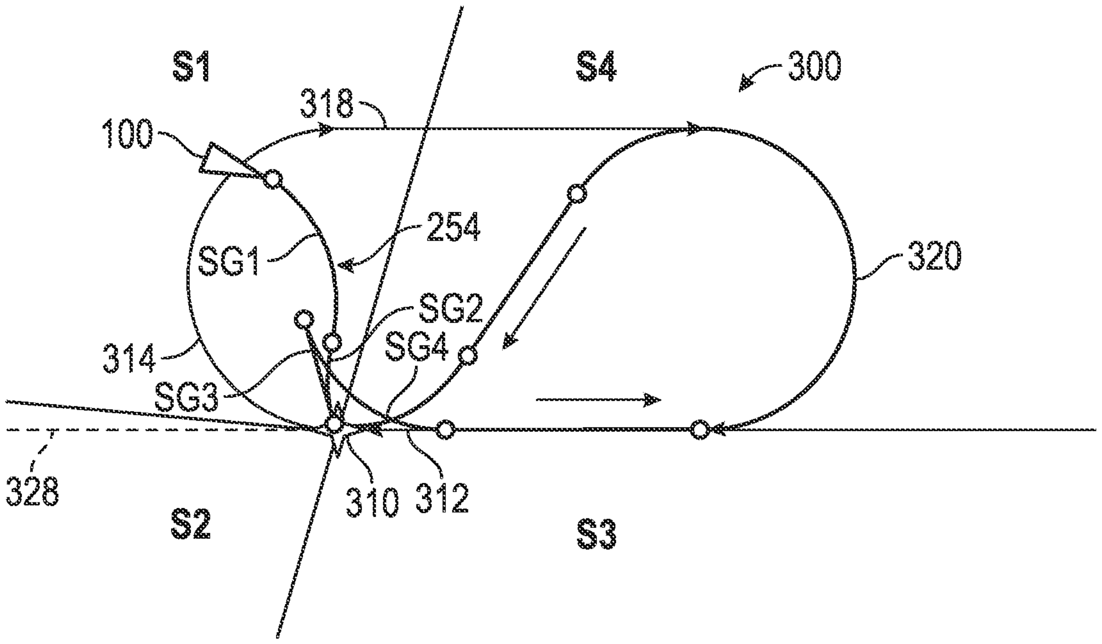
FIG. 6 is a diagram showing an entry trajectory profile for transitioning an aircraft into a holding pattern, with the entry trajectory profile including at least one discontinuity.
Figure 7:
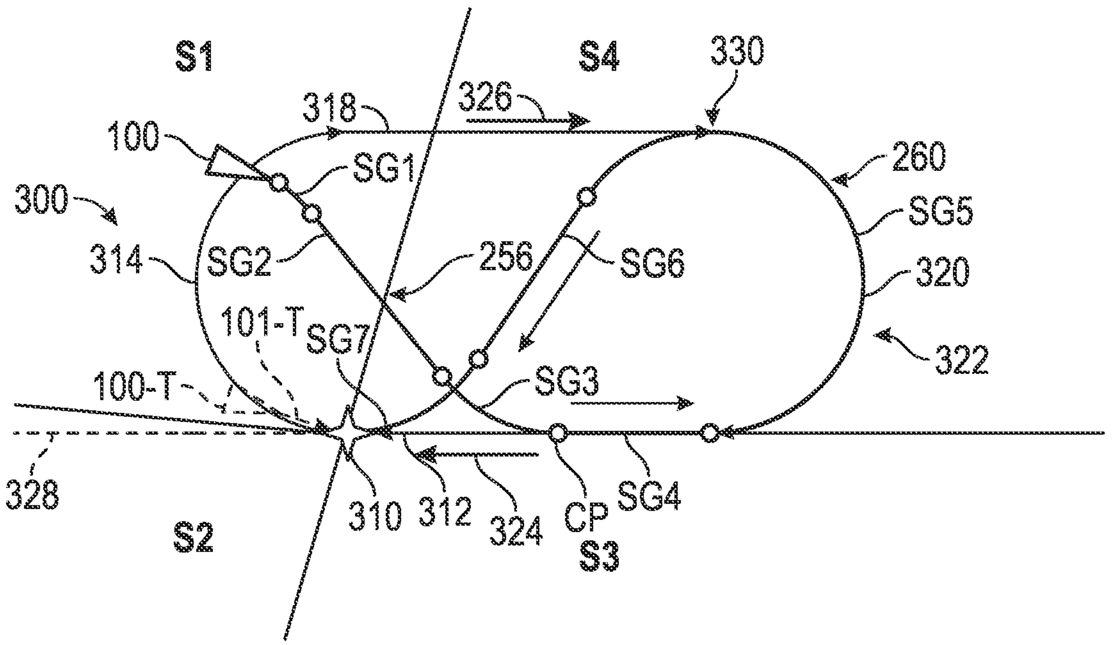
FIG. 7 is a diagram showing a modified entry trajectory profile built according to a first build construction.

With general reference now to FIGS. 3, 6 and 7, an example manner will now be provided in which a modified entry trajectory profile can be built according to a first build construction in response to the first sector being determined as the sector. FIG. 6 is a diagram showing an entry trajectory profile 254 for transitioning an aircraft into the holding pattern 300, with the entry trajectory profile 254 including at least one discontinuity. FIG. 7 is a diagram showing a modified entry trajectory profile 256 built according to a first build construction, with the first build construction being utilized in response to the first sector S1 being determined as the sector at block 250-1.

As shown in FIG. 6, the entry trajectory profile 254 (e.g., built at block 244 in FIG. 2) provides a discontinuous and unflyable trajectory to enter the holding pattern 300, and thus, the entry trajectory profile 254 is identified as having a discontinuity. Particularly, the entry trajectory profile 254 is built so that the aircraft 100 is directed to the entry waypoint 310, and upon reaching the entry waypoint 310 by way of a first segment SG1 and a second segment SG2, the entry trajectory profile 254 provides for the aircraft 100 to make nearly a one hundred eighty degree (180°) turn from the entry waypoint 310 and fly along a third segment SG3. Such a turn would result in an impermissible flight maneuver, e.g., for violating at least one operational rule set forth in the operational rules 222 (FIG. 2). After completing the third segment SG3, the entry trajectory profile 254 provides for the aircraft 100 to fly along a fourth segment SG4. To transition from the third segment SG3 to the fourth segment SG4, another nearly one hundred eighty degree (180°) turn is planned. Such a turn would result in another impermissible flight maneuver, e.g., for violating at least one operational rule set forth in the operational rules 222 (FIG. 2).

Thus, with two identified discontinuities in the entry trajectory profile 254 of FIG. 6, the modified entry trajectory profile 256 of FIG. 7 is built in accordance with inventive aspects of the present disclosure. Specifically, the modified entry trajectory profile 256 of FIG. 7 is built according to a first build construction in response to the first sector S1 being determined as the sector at block 250-1 (see e.g., the translated aircraft 100-T and translated track angle 100-T being located in the first sector S1 in FIG. 7). When the sector is determined as a first sector S1, the modified entry trajectory profile 256 is generated in accordance with a first build construction (e.g., an inbound capture construction) so that i) a capture of the holding pattern 300 is made at the inbound course 312 of the holding pattern 300 in a direction opposite to the inbound direction 324; and ii) a tear drop pattern 260 is created that ends at the entry waypoint 310. The modified entry trajectory profile 256 is generated so as to intersect the entry waypoint 310 a single time with a last segment of the modified entry trajectory profile 256 being the segment that intersects the entry waypoint 310.

Accordingly, as shown in FIG. 7, the modified entry trajectory profile 256 can include one or more segments arranged, without first intersecting the entry waypoint 310, to capture the inbound course 312 of the holding pattern 300 in a direction opposite to the inbound direction 324 and one or more segments forming the tear drop pattern 260 that ends at the entry waypoint 310. The one or more segments arranged to capture the inbound course 312 of the holding pattern 300 in a direction opposite to the inbound direction 324 include a first segment SG1, a second segment SG2, and a third segment SG3. The first segment SG1 is curved to smooth the transition of the aircraft 100 with the second segment SG2, which stems from the first segment SG1 and is straight and configured to direct the aircraft 100 toward the inbound course 312. The third segment SG3 stems from the second segment SG2 and captures the inbound course 312 in a direction opposite to the inbound direction 324 at a capture point CP (or interception point). The angle of the second segment SG2 relative to the inbound course 312 and the turn radius of the third segment SG3 are selected so as to allow the aircraft 100 to make a smooth capture of the inbound course 312 at the capture point CP. The turn radii of the first and third segments SG1 and SG3 can be based on the current or predicted aircraft speed at the arrival to the holding pattern 300, for example.

The one or more segments forming the tear drop pattern 260 include a fourth segment SG4, a fifth segment SG5, a sixth segment SG6, and a seventh segment SG7. The fourth segment SG4 stems from the third segment SG3 and follows the inbound course 312 in a direction opposite to the inbound direction 324. The fifth segment SG5 stems from the fourth segment SG4 and follows the second turn 320 at the outbound end 322 of the holding pattern 300 and continues past an end point 330 of the outbound course 318, turning the modified entry trajectory profile 256 back toward the inbound course 312. At the end point 330, the modified entry trajectory profile 256 departs from following the holding pattern 300 in a reverse manner. The sixth segment SG6 stems from the fifth segment SG5 and is a straight line segment that is configured to direct the aircraft 100 toward the inbound course 312. The seventh segment SG7 stems from the sixth segment SG6 and transitions the aircraft 100 into the holding pattern 300 at the entry waypoint 310. The angle of the sixth segment SG6 relative to the inbound course 312 and the turn radius of the seventh segment SG7 are selected so as to allow the aircraft 100 to make a smooth transition into the holding pattern 300 at the entry waypoint

310. Particularly, in this example, the fifth and seventh segments SG5 and SG7 have the same turn radius, and are equal to the turn radii of the two turns of the holding pattern 300. The sixth segment SG6 is adjusted to be tangent to the fifth and seventh segments SG5 and SG7, up to a point where the angle of sixth segment SG6 relative to the inbound course 312 is maximum of ninety degrees (90°) (when this limit is reached, the build construction changes to the one shown in FIG. 9, wherein the entry construction extends beyond the area of the holding pattern 300 to be able to build the tear drop ending at the waypoint 310). Upon entering the holding pattern 300 at the entry waypoint 310, the aircraft 100 can fly the holding pattern 300.

Accordingly, the modified entry trajectory profile 256 is generated at block 250-3 in accordance with the first build construction determined at block 250-2, which is the build construction type used when the first sector S1 is determined as the sector at block 250-1. The modified entry trajectory profile 256 is generated to provide a continuous and flyable entry transition into the holding pattern 300 despite limited airspace.

Sector 1—First Build Construction—Extended Capture

In some example aspects, after determining the build construction at block 250-2, a determination can be made as to the implementation scheme for generating the modified entry trajectory profile 256 according to the first build construction. In some instances, for example, in generating a modified entry trajectory in accordance with a first build construction, it may be determined whether a capture of the holding pattern would be past a starting point of an inbound course of the holding pattern or whether a length of the inbound course of the holding pattern is shorter than two times a turn radius of turns of the holding pattern. In such instances, when the capture of the holding pattern would not be past the starting point of the inbound course of the holding pattern or the length of the inbound course of the holding pattern is not shorter than two times the turn radius of the turns of the holding pattern, the modified entry trajectory can be generated according to a normal capture implementation of the first build construction (e.g., as shown in FIG. 7 and described in the accompanying text). However, when the capture of the holding pattern would be past the starting point of the inbound course of the holding pattern or the length of the inbound course of the holding pattern is shorter than two times the turn radius of the turns of the holding pattern, the modified entry trajectory can be generated according to an extended capture implementation of the first build construction.

Figure 8:
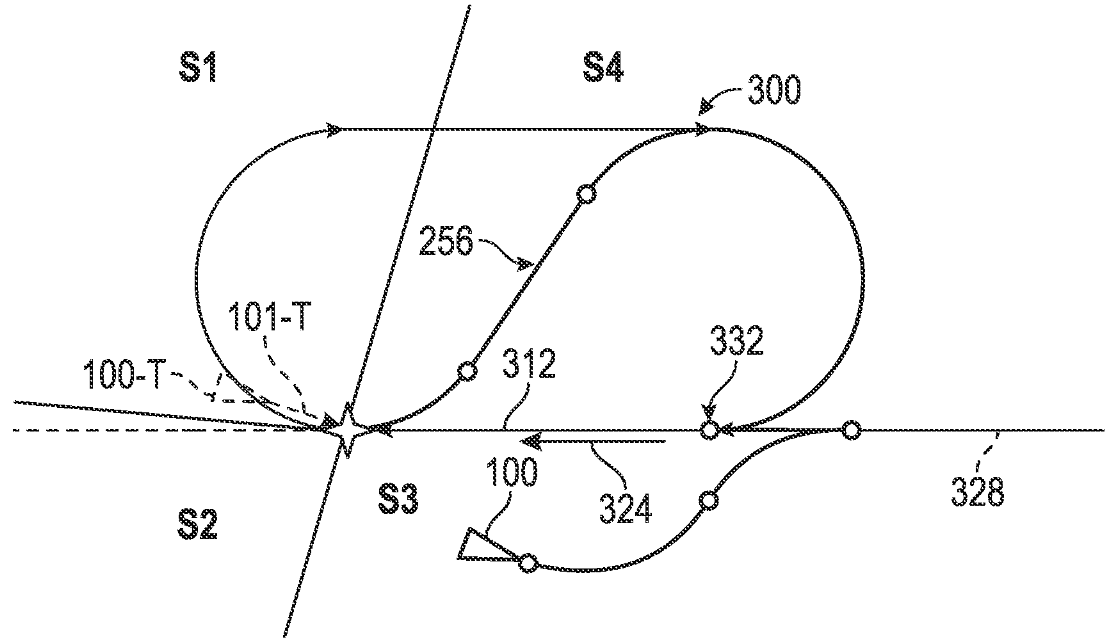
FIG. 8 is a diagram showing a scenario where a modified entry trajectory profile is built according to a normal capture implementation of the first build construction, with a capture of the holding pattern being past a starting point of an inbound course of the holding pattern.

By way of example, FIG. 8 is a diagram showing a scenario where the modified entry trajectory profile 256 is built according to a normal capture implementation of the first build construction in response to the first sector S1 being determined as the sector at block 250-1 (see e.g., the translated aircraft 100-T and translated track angle 100-T being located in the first sector S1 in FIG. 8; the aircraft 100 is physically located in the third sector S3). As shown in FIG. 8, in this example, if the modified entry trajectory profile 256 was built according to the normal capture implementation of the first build construction, the trajectory would include a discontinuity. In this regard, the aircraft 100 would be unable to fly the modified entry trajectory profile 256 without performing an impermissible flight maneuver, if at all. The aircraft 100 would be unable to capture the inbound course 312 of the holding pattern 300 in a direction opposite to the inbound direction 324 in accordance with the normal capture implementation. To make the entry transition into the holding pattern continuous and flyable, the extended capture implementation of the first build construction can be utilized.

Figure 9:
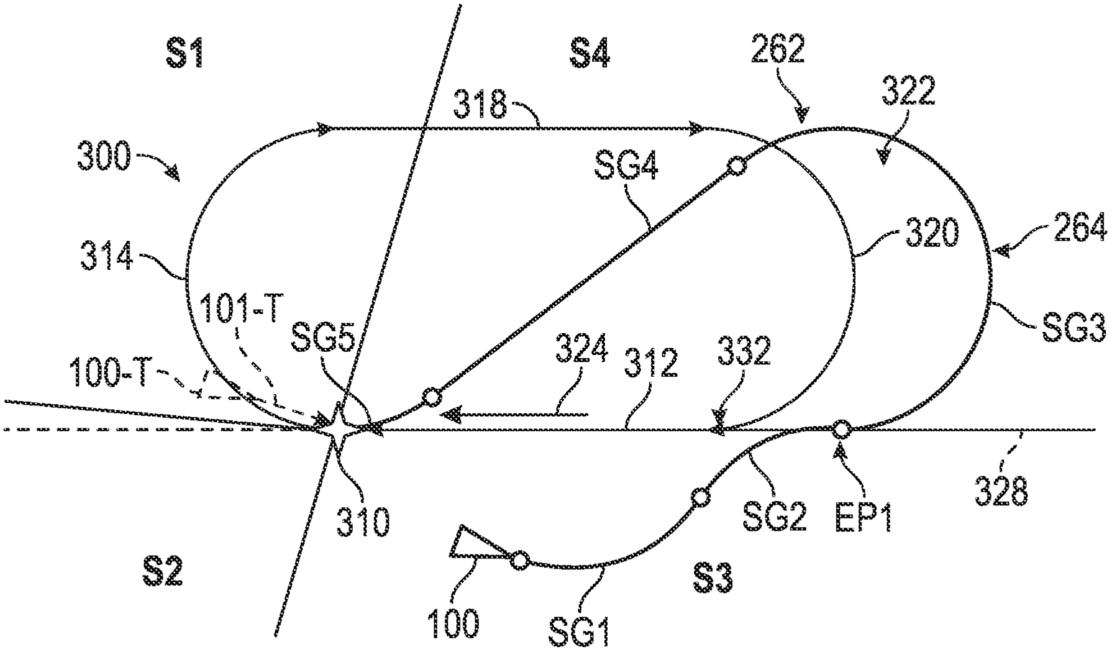
FIG. 9 is a diagram showing a modified entry trajectory profile built according to an extended capture implementation of the first build construction.

Accordingly, FIG. 9 is a diagram showing a modified entry trajectory profile 256 built according to an extended capture implementation of the first build construction. When the capture of the holding pattern 300 would be past a starting point 332 of the inbound course 312 of the holding pattern 300 as shown in FIG. 8, the modified entry trajectory profile 256 is generated according to an extended capture implementation of the first build construction so that i) a capture is made past the starting point 332 of the inbound course 312 at the inbound reference line 328, which extends from and is coaxial with the inbound course 312, and in a direction opposite to the inbound direction 324; and ii) a tear drop pattern 262 is created having a tear drop arc 264 built beyond the turn-to-inbound course (i.e., the second turn 320) of the holding pattern, and the tear drop pattern 262 ends at the entry waypoint 310. In this regard, an "extended capture" is made at the inbound reference line 328 in a direction opposite to the inbound direction 324. The capture is made at an extended point EP1 that is further away from the entry waypoint 310 than the starting point 332 of the inbound course 312. Also, the tear drop arc 264 is shown built further away from the entry waypoint 310 than an arc of the second turn 320. In this way, the arc of the tear drop is extended out relative to the second turn 320 of the holding pattern 300.

The modified entry trajectory profile 256 of FIG. 9 built according to the extended capture implementation of the first build construction can include one or more segments arranged, without first intersecting the entry waypoint 310, to capture the holding pattern 300 past the starting point 332 of the inbound course 312 in a direction opposite to the inbound direction 324 and one or more segments forming a tear drop that ends at the entry waypoint 310. The one or more segments arranged to capture the inbound reference line 328 past the starting point 332 of the inbound course 312 in a direction opposite to the inbound direction 324 include a first segment SG1 and a second segment SG2. The first segment SG1 is curved and directs the aircraft 100 toward the inbound reference line 328. The second segment SG2, which is also curved, stems from the first segment SG1 and smoothly transitions the trajectory to capture the inbound reference line 328 past the starting point 332 of the inbound course 312 in a direction opposite to the inbound direction 324.

The one or more segments forming the tear drop that ends at the entry waypoint 310 include a third segment SG3, a fourth segment SG4, and a fifth segment SG5. The third segment SG3 stems from the second segment SG2 and follows the arc of the second turn 320, albeit at an extended position or further away from the entry waypoint 310 than the arc of the second turn 320, and then crosses the second turn 320 of the holding pattern 300, turning the modified entry trajectory profile 256 toward the inbound course 312. The fourth segment SG4 stems from the third segment SG3 and is a straight line segment that is configured to direct the aircraft 100 toward the inbound course 312. The fifth segment SG5 stems from the fourth segment SG4 and transitions the aircraft 100 into the holding pattern 300 at the entry waypoint 310. The angle of the fourth segment SG4 relative to the inbound course 312 and the turn radius of the fifth segment SG5 are selected so as to allow the aircraft 100 to make a smooth transition into the holding pattern 300 at the entry waypoint 310. Upon entering the holding pattern 300 at the entry waypoint 310, the aircraft 100 can follow the holding pattern 300.

Accordingly, the modified entry trajectory profile 256 is generated in accordance with the extended capture implementation of the first build construction to provide a continuous and flyable entry transition into the holding pattern 300 despite limited airspace.

As noted previously, in some instances, in generating a modified entry trajectory in accordance with a first build construction, it may be determined whether a length of the inbound course of the holding pattern is shorter than two times a turn radius of turns of the holding pattern. When the length of the inbound course of the holding pattern is indeed shorter than two times a turn radius of the turns of the holding pattern, the extended capture implementation of the first build construction can be implemented.

Figure 10:
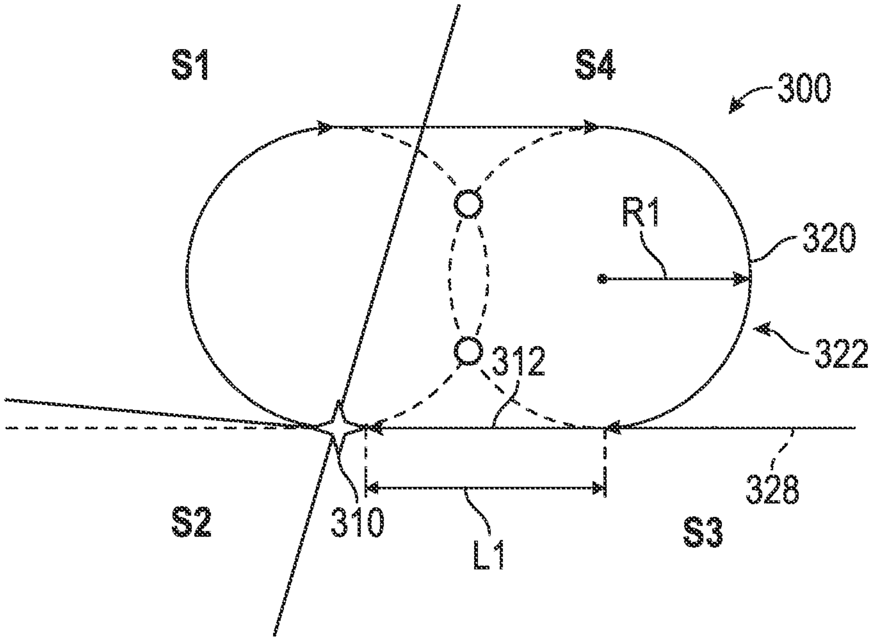
FIG. 10 is a diagram showing an example holding pattern where a length of an inbound course of the holding pattern is shorter than two times a turn radius of turns of the holding pattern.

For instance, FIG. 10 provides a diagram showing an example holding pattern 300. The inbound course 312 has a length L1 and the second turn 320 at the outbound end 322 of the holding pattern 300 has a turn radius R1. In this example, the length L1 of the inbound course 312 is shorter than two times the turn radius R1 of the second turn 320 of the holding pattern 300. Accordingly, in response to this determination, a modified entry trajectory profile is generated in accordance with the extended capture implementation of the first build construction. Consequently, rather than the modified entry trajectory profile capturing the inbound course 312 as with a normal capture implementation of the first build construction, the inbound reference line 328 would be captured at an "extended point" and a tear drop would be created thereafter to direct an aircraft to the entry waypoint 310, e.g., in a similar manner as shown in FIG. 9. Such an implementation effectively "extends" the holding pattern 300 to make a continuous and flyable trajectory to enter the holding pattern 300. The extended capture implementation of the first build construction may be particularly useful for instances in which the aircraft 100 is physically located in the third sector S3 or fourth sector S4, but can also be used in some instances when the aircraft 100 is physically located in the first sector S1 or the second sector S2.

Sectors, 2, 3, and 4—Second Build Construction—Normal Capture

Figure 11:
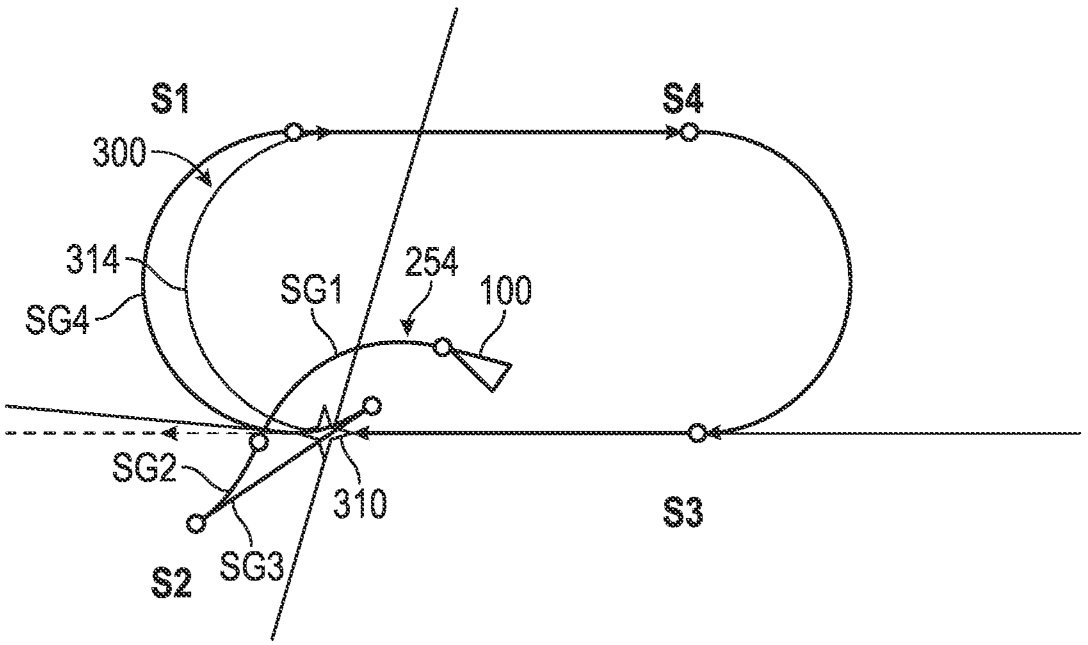
FIG. 11 is a diagram showing an entry trajectory profile for transitioning an aircraft into a holding pattern, with the entry trajectory profile including at least one discontinuity.
Figure 12:
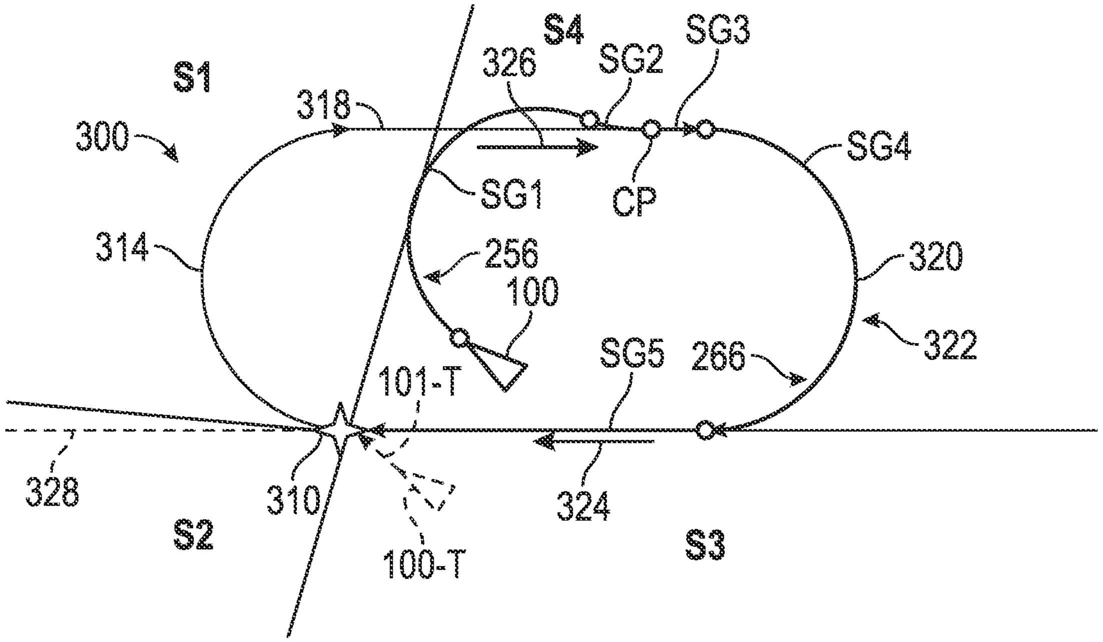
FIG. 12 is a diagram showing a modified entry trajectory profile built according to a second build construction.

With reference now to FIGS. 11 and 12, an example manner is provided in which a modified entry trajectory profile can be built according to a second build construction in response to the second, third, or fourth sector being determined as the sector. FIG. 11 is a diagram showing an entry trajectory profile 254 for transitioning into the holding pattern 300, with the entry trajectory profile 254 including at least one discontinuity. FIG. 12 is a diagram showing a modified entry trajectory profile 256 built according to a second build construction, with the second build construction being utilized in response to the third sector S3 being determined as the sector at block 250-1.

As shown in FIG. 11, the entry trajectory profile 254 (e.g., built at block 244 in FIG. 2) provides a discontinuous and unflyable trajectory to enter the holding pattern 300, and thus, the entry trajectory profile 254 is identified as having a discontinuity. Particularly, the entry trajectory profile 254 is built to attempt to direct the aircraft 100 through or to the entry waypoint 310, but as depicted, the aircraft 100 is too close to the entry waypoint 310 for this to be possible, e.g., without an impermissible flight maneuver being performed. Consequently, the first segment SG1 of the entry trajectory profile 254 extends past the entry waypoint 310. A second segment SG2 of the entry trajectory profile 254 is built to attempt to align the aircraft 100 to the entry waypoint 310, and a third segment SG3 stemming from the second segment SG2 is built to direct the aircraft 100 back to the entry waypoint 310. In transitioning from the second segment SG2 to the third segment SG3, the entry trajectory profile 254 provides for the aircraft 100 to make nearly a one hundred eighty degree (180°) turn, which would result in an impermissible flight maneuver, e.g., for violating at least one operational rule set forth in the operational rules 222 (FIG. 2). Further, in transitioning from the third segment SG3 to a fourth segment SG4, the entry trajectory profile 254 provides for the aircraft 100 to make another nearly one hundred eighty degree (180°) turn, which would result in another impermissible flight maneuver, e.g., for violating at least one operational rule set forth in the operational rules 222 (FIG. 2). These discontinuities make the entry trajectory profile 254 discontinuous and unflyable.

Thus, with two identified discontinuities in the entry trajectory profile 254 of FIG. 11, the modified entry trajectory profile 256 of FIG. 12 is built in accordance with inventive aspects of the present disclosure. Specifically, the modified entry trajectory profile 256 of FIG. 11 is built according to a second build construction in response to the third sector S3 being determined as the sector at block 250-1 (see e.g., in FIG. 12, the translated aircraft 100-T and translated track angle 100-T being located in the third sector S3). When the sector is determined as a third sector S3 (or as the second sector S2 or the fourth sector S4), the modified entry trajectory profile 256 is generated in accordance with a second build construction so that i) a capture of the holding pattern 300 is made at the outbound course 318 of the holding pattern 300 in a direction with the outbound direction 326; and ii) a following pattern 266 is created that follows the holding pattern 300 and ends at the entry waypoint 310. The modified entry trajectory profile 256 is generated so as to intersect the entry waypoint 310 a single time with a last segment (e.g., a fifth segment SG5 in the example of FIG. 12) of the modified entry trajectory profile 256 being the segment that intersects the entry waypoint 310.

Accordingly, as shown in FIG. 12, the modified entry trajectory profile 256 can include one or more segments arranged, without first intersecting the entry waypoint 310, to capture the outbound course 318 of the holding pattern 300 in a direction with the outbound direction 326 and one or more segments forming the following pattern 266 that ends at the entry waypoint 310.

The one or more segments arranged to capture the outbound course 318 of the holding pattern 300 in a direction with the outbound direction 326 include a first segment SG1 and a second segment SG2. The first segment SG1 is curved to direct the aircraft 100 toward the outbound course 318 and position the trajectory for capture of the outbound course 318. The second segment SG2 stems from the first segment SG1 and captures the outbound course 318 in a direction with the outbound direction 326 at a capture point CP (or interception point). In this example, the modified entry trajectory profile 256 is generated so that, prior to the capture of the holding pattern 300 at the outbound course 318 (e.g., at the capture point CP), a segment (e.g., the first segment SG1) of the modified entry trajectory profile 256 crosses the outbound course 318. In other examples, the modified entry trajectory profile 256 may not cross the outbound course 318 prior to capture of the holding pattern 300 at the outbound course 318. For instance, in such examples, the modified entry trajectory profile 256 can capture the outbound course 318 without first crossing over the outbound course 318. The turn radii of the first segment SG1 and the second segment SG2 are selected so as to allow the aircraft 100 to make a smooth capture of the outbound course 318 at the capture point CP. The turn radii of the first and second segments SG1, SG2 can be based on the aircraft current or predicted speed at the arrival of the holding pattern 300.

The one or more segments forming the following pattern 266 include a third segment SG3, a fourth segment SG4, and a fifth segment SG5. The third segment SG3 stems from the second segment SG2 and follows the outbound course 318 in a direction with the outbound direction 326. The fourth segment SG4 stems from the third segment SG3 and follows the second turn 320 at the outbound end 322 of the holding pattern 300. The fourth segment SG4 can have the same radius as the radii of the two turns of the holding pattern 300. The fifth segment SG5 stems from the fourth segment SG4 and is a straight line segment that is configured to direct the aircraft 100 toward the entry waypoint 310 along the inbound course 312 in a direction with the inbound direction 324. Upon entering the holding pattern 300 at the entry waypoint 310, the aircraft 100 can follow the holding pattern 300.

Accordingly, the modified entry trajectory profile 256 is generated in accordance with the second build construction (i.e., the construction used when one of the second, third, or fourth sectors S2, S3, S4 is determined as the sector) to provide a continuous and flyable entry transition into the holding pattern 300 despite limited airspace.

Sectors, 2, 3, and 4—Second Build Construction—Expanded Capture

In some instances, in generating a modified entry trajectory in accordance with a second build construction, it may be determined whether a capture of the holding pattern would be past an ending point of an outbound course of the holding pattern. In such instances, when the capture of the holding pattern would not be past the ending point of the outbound course of the holding pattern, the modified entry trajectory is generated according to a normal capture implementation of the second build construction (e.g., as shown in FIG. 12 and described in the accompanying text). However, when the capture of the holding pattern would be past the ending point of the outbound course of the holding pattern, the modified entry trajectory is generated according to an extended capture implementation of the second build construction.

Figure 13:
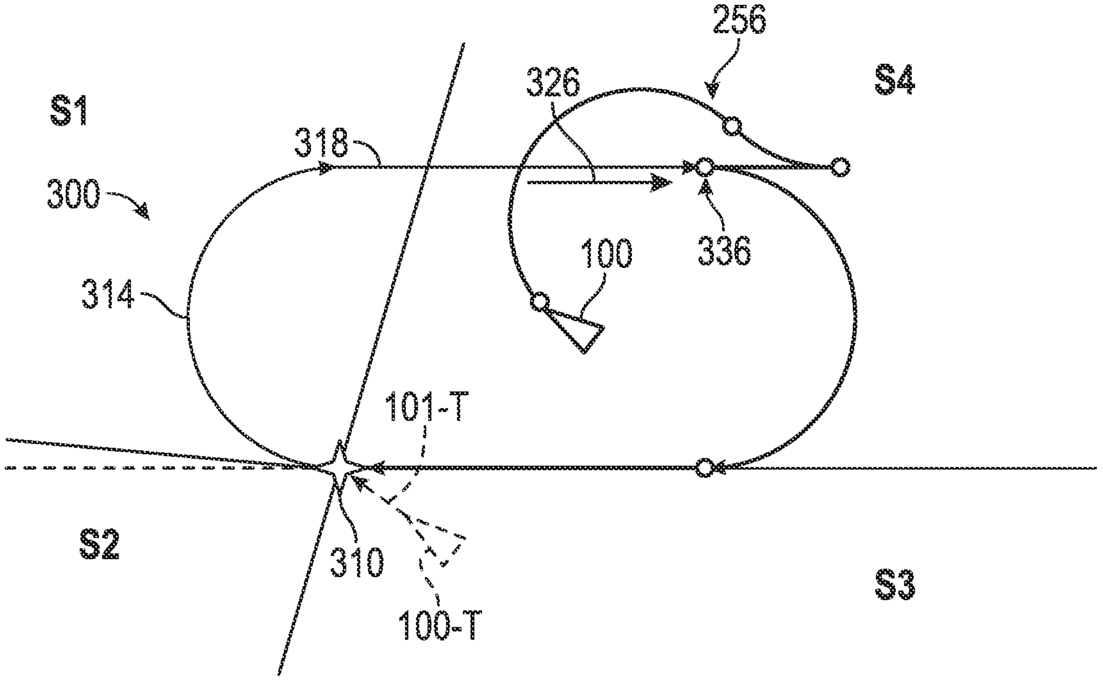
FIG. 13 is a diagram showing a scenario where a modified entry trajectory profile is built according to a normal capture implementation of the second build construction, with a capture of the holding pattern being past an ending point of an outbound course of the holding pattern.

By way of example, FIG. 13 is a diagram showing a scenario where the modified entry trajectory profile 256 is built according to a normal capture implementation of the second build construction in response to the third sector S3 being determined as the sector at block 250-1 (see e.g., the translated aircraft 100-T and translated track angle 100-T being located in the third sector S3 in FIG. 13; the aircraft 100 is physically located in the fourth sector S4). As shown in FIG. 13, in this example, if the modified entry trajectory profile 256 was built according to the normal capture implementation of the second build construction, the trajectory would include a discontinuity. In this regard, the aircraft 100 would be unable to fly the modified entry trajectory profile 256 without performing an impermissible flight maneuver, if at all. Specifically, the aircraft 100 would be unable to capture the outbound course 318 of the holding pattern 300 in a direction with the outbound direction 326 in accordance with the normal capture implementation. To make the entry transition into the holding pattern continuous and flyable, the extended capture implementation of the second build construction can be utilized.

Figure 14:
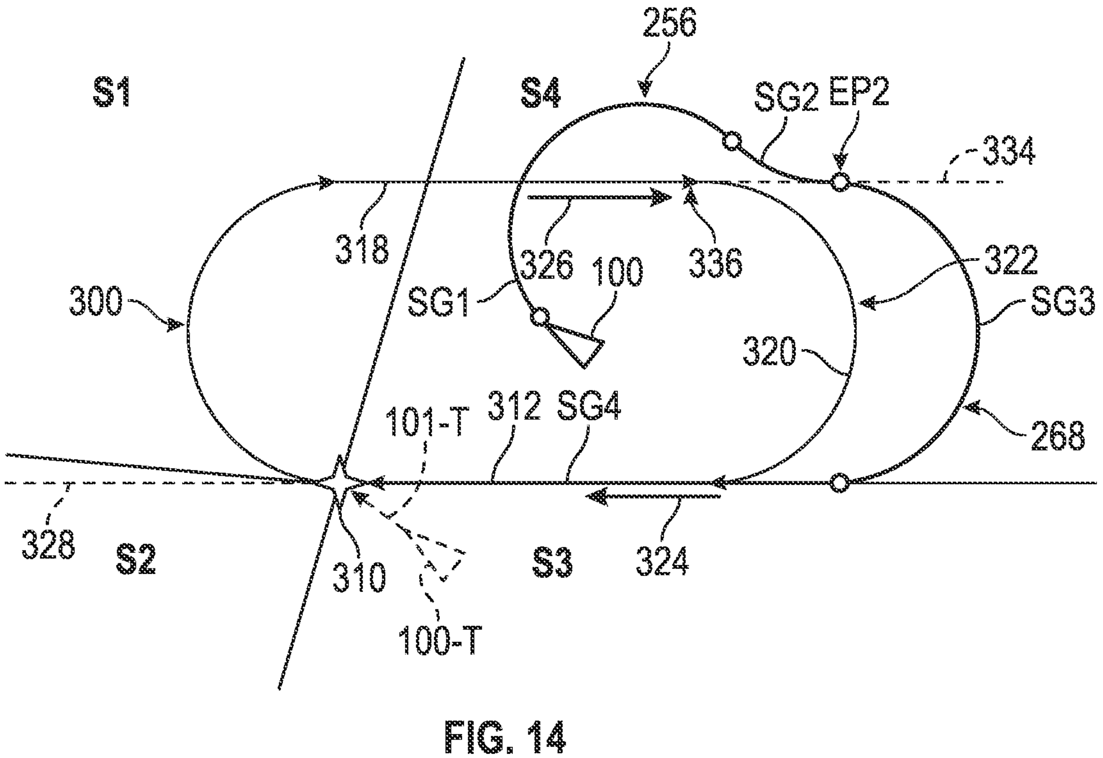
FIG. 14 is a diagram showing a modified entry trajectory profile built according to an extended capture implementation of the second build construction.

FIG. 14 is a diagram showing a modified entry trajectory profile 256 built according to an extended capture implementation of the second build construction. When the capture of the holding pattern 300 would be past an ending point 336 of the outbound course 318 of the holding pattern 300 as shown in FIG. 13, the modified entry trajectory profile 256 is generated according to an extended capture implementation of the second build construction so that i) a capture is made past the ending point 336 of the outbound course 318 at an outbound reference line 334, which extends from and is coaxial with the outbound course 318 (e.g., as shown in FIG. 14), and in a direction with the outbound direction 326; and ii) an extended following pattern 268 is built having an arc segment (e.g., a third arc segment SG3 in FIG. 14) and an inbound segment (e.g., a fourth segment SG4 in FIG. 14), the arc segment is built further beyond the turn-to-inbound course (i.e., the second turn 320) of the holding pattern, and the inbound segment ends at the entry waypoint 310. In this regard, an "extended capture" is made at the outbound reference line 334 in a direction with the outbound direction 326. The capture is made at an extended point EP2 that is further away from the entry waypoint 310 than the ending point 336 of the outbound course 318. Also, the arc segment (e.g., the third segment SG3) of the extended following pattern 268 is built further away from the entry waypoint 310 compared to the second turn 320. In this way, the arc segment is extended out relative to the second turn 320 of the holding pattern 300.

The modified entry trajectory profile 256 of FIG. 14 built according to the extended capture implementation of the second build construction can include one or more segments arranged, without first intersecting the entry waypoint 310, to capture the holding pattern 300 past the outbound course 318 in a direction with the outbound direction 326 and one or more segments forming the extended following pattern 268 that ends at the entry waypoint 310.

The one or more segments arranged to capture the outbound reference line 334 past the ending point 336 of the outbound course 318 in a direction with the outbound direction 326 include a first segment SG1 and a second segment SG2. The first segment SG1 is curved and directs the aircraft 100 toward the outbound reference line 334. The second segment SG2, which is also curved, stems from the first segment SG1 and smoothly transitions the trajectory to capture the outbound reference line 334 past the outbound course 318 in a direction with the outbound direction 326. Prior to capture of the outbound reference line 334 at the extended point EP2, the modified entry trajectory profile 256 crosses the outbound course 318. In other examples, the modified entry trajectory profile 256 may not cross the outbound course 318 or the outbound reference line 334 prior to capture of the outbound reference line 334.

The one or more segments forming the extended following pattern 268 include a third segment SG3 and a fourth segment SG4. The third segment SG3 stems from the second segment SG2 and follows the arc of the second turn 320, albeit at an extended position or further away from the entry waypoint 310 than the arc of the second turn 320. The third segment SG3 ends at the inbound reference line 328. The fourth segment SG4 stems from the third segment SG3 and is a straight line segment that follows the inbound course 312 along the inbound direction 324. The fourth segment SG4 ends at the entry waypoint 310. Upon entering the holding pattern 300 at the entry waypoint 310, the aircraft 100 can follow the holding pattern 300.

Accordingly, the modified entry trajectory profile 256 is generated in accordance with the extended capture implementation of the second build construction to provide a continuous and flyable entry transition into the holding pattern 300 despite limited airspace.

Method

Figure 15:
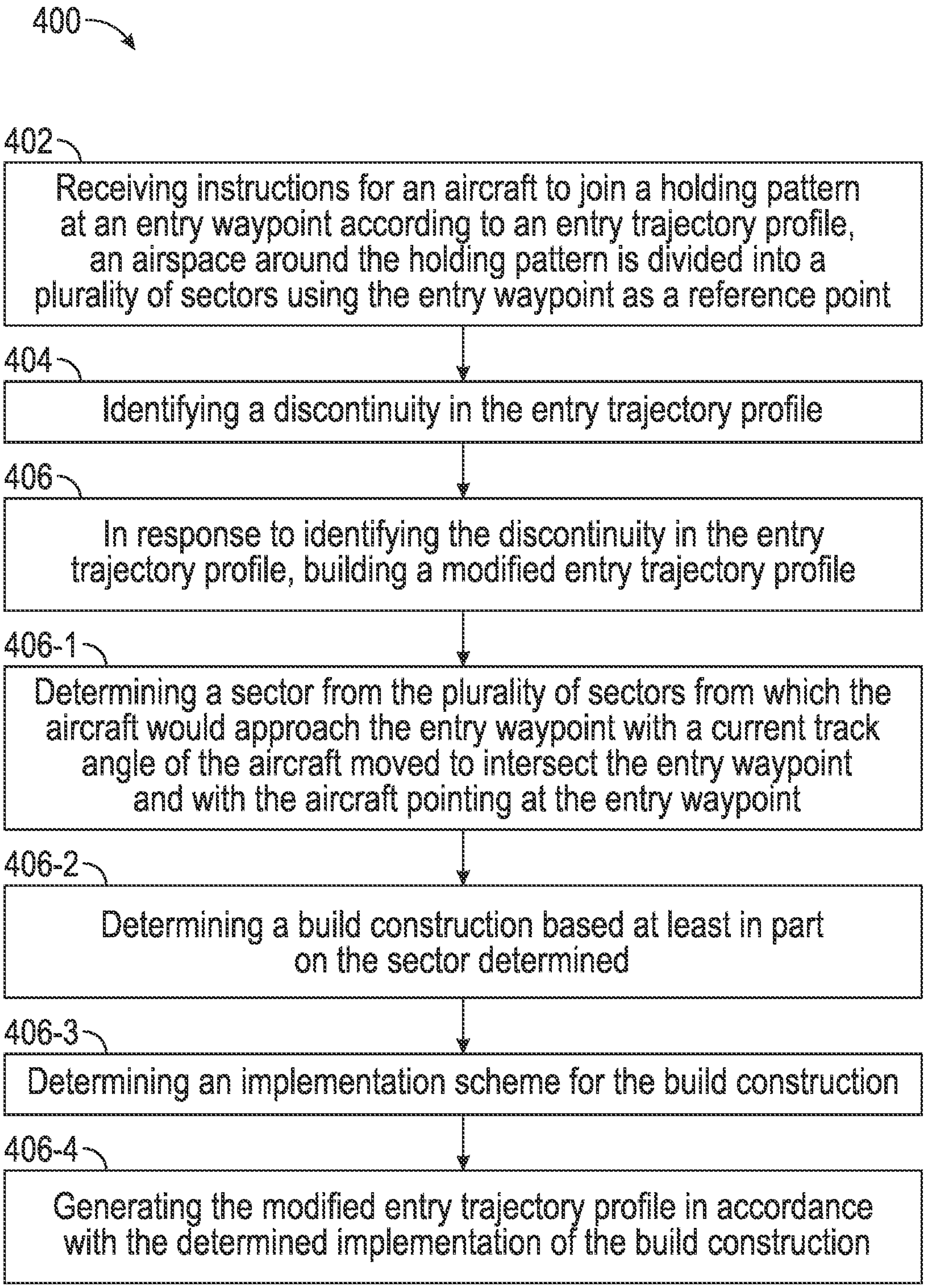
FIG. 15 is a flow diagram of an example method according to example aspects of the present disclosure.

FIG. 15 is a flow diagram of a method 400 of building a modified entry trajectory profile according to example aspects of the present disclosure.

At 402, the method 400 can include receiving instructions for an aircraft to join a holding pattern at an entry waypoint according to an entry trajectory profile. An airspace around the holding pattern can be divided into a plurality of sectors using the entry waypoint as a reference point. For instance, one or more processors of a system (e.g., a FMS) can receive instructions for an aircraft to join a holding pattern at an entry waypoint, e.g., to delay landing due to traffic congestion, poor weather, runway unavailability, emergencies on the ground, etc. The plurality of holding sectors can include a first sector, a second sector, a third sector, and a fourth sector, e.g., as shown in FIG. 4. The entry trajectory can be constructed as a nominal hold entry transition defined in RTCA Document DO-236C, Appendix E, for example.

At 404, the method 400 can include identifying a discontinuity in the entry trajectory profile. For instance, due to limited airspace or the aircraft being too close to the entry waypoint, the entry trajectory profile can include a discontinuity that would make the transition into the holding pattern discontinuous and/or unflyable and/or in violation of one or more operational rules and/or guidelines. Accordingly, the standard entry trajectory profile is "bypassed" in favor of a modified entry trajectory profile (built at 406 as provided below) that changes at least one aspect of the entry trajectory profile.

At 406, the method 400 can include, in response to identifying the discontinuity in the entry trajectory profile, building a modified entry trajectory profile. For instance, the one or more processors of the system can build the modified entry trajectory profile to modify, replace, or otherwise "bypass" the entry trajectory profile. The modified entry trajectory profile can be built as set forth below.

At 406-1, building the modified entry trajectory profile can include determining a sector from the plurality of sectors from which the aircraft would approach the entry waypoint with a current track angle of the aircraft moved to intersect the entry waypoint and with the aircraft pointing at the entry waypoint. For instance, with brief reference to FIG. 4, the sector can be determined as the first sector S1, the second sector S2, the third sector S3, or the fourth sector S4. In some example aspects, determining the sector from which the aircraft would approach the entry waypoint if a current track angle of the aircraft was moved to intersect the entry waypoint and the aircraft was pointing at the entry waypoint can include translating the current track angle to the entry waypoint so as to render a translated track angle. The translated track angle intersects the entry waypoint and the aircraft points at the entry waypoint. The sector in which the aircraft would be located in such a translated position is determined as the sector. In some example aspects, determining the sector from which the aircraft would approach the entry waypoint if a current track angle of the aircraft was moved to intersect the entry waypoint and the aircraft was pointing at the entry waypoint can include determining a course change angle based at least in part on the translated track angle and an inbound course of the holding pattern (or an inbound reference line associated with the inbound course). The sector can be determined based at least in part on the course change angle, e.g., by way of a lookup table. For instance, the sector can be determined by correlating the course change angle to one of a plurality of predefined angle ranges, wherein each predefined angle range of the plurality of predefined angles ranges corresponds to one of the plurality of sectors.

At 406-2, building the modified entry trajectory profile can include determining a build construction based at least in part on the sector determined at 406-1. The build construction can be one of a plurality of possible build constructions. For instance, with brief reference again to FIG. 4, when the first sector S1 is determined as the sector at 406-1, the build construction can be determined as a first build construction (e.g., an inbound capture construction). When the second, third, or fourth sector S2, S3, S4 is determined as the sector at 406-1, the build construction can be determined as a second build construction (e.g., an outbound capture construction).

At 406-3, building the modified entry trajectory profile can include determining an implementation scheme for the build construction determined at 406-2. The implementation scheme can be determined from one of a plurality of possible implementation schemes, which can include at least a normal capture implementation and an extended capture implementation. As one example, when a first build construction is determined at 406-2 in response to the first sector being determined at 406-1, the first build construction can be implemented as a normal capture implementation in which an inbound course of a holding pattern is captured or as an extended capture implementation in which an inbound reference line stemming from the inbound course is captured at an "extended point" beyond the inbound course. As another example, when a second build construction is determined at 406-2 in response to the second, third, or fourth sector being determined at 406-1, the second build construction can be implemented as a normal capture implementation in which an outbound course of a holding pattern is captured or as an extended capture implementation in which an outbound reference line stemming from the outbound course is captured at an "extended point" beyond the outbound course.

At 406-4, building the modified entry trajectory profile can include generating the modified entry trajectory profile that changes at least one aspect of the entry trajectory profile based at least in part on the sector determined. That is, based on the sector determined at 406-1, the build construction with which to build the modified entry trajectory profile can be determined at 406-2. In some aspects, an implementation scheme for the build construction can be determined at 406-3. Accordingly, the modified entry trajectory profile can be generated at 406-4 in accordance with the determined implementation scheme for the build construction, which, as noted, is determined based on the sector determined at 406-1.

Accordingly, at 406, the modified entry trajectory profile can be built so as to be a continuous and flyable path for an aircraft to enter the holding pattern at the entry waypoint. The modified entry trajectory profile can be used to build a final trajectory profile, which can ultimately be presented to the flight crew or systems of the aircraft and executed. Advantageously, the modified entry trajectory profile can provide a flyable lateral trajectory that a FCS can command the aircraft to follow without making it fly off-path. In addition, use of the modified entry trajectory can minimize or eliminate the need for flight crew intervention even when limited airspace is available. Moreover, the modified entry trajectory profile follows the standard holding pattern entry rules as much as possible, and an annunciation to the flight crew can be provided indicating that part of the standard holding pattern entry trajectory is modified or bypassed due to the limited space available. Further, increased safety levels can be provided by improving situational awareness and helping meet the airspace restrictions around the holding pattern. The situational awareness of the flight crew can be improved namely because a continuous and flyable trajectory that the aircraft actually is able to fly can be presented to them, rather than a discontinuous lateral trajectory that the aircraft cannot fly. In the past, when a discontinuous lateral trajectory has been presented to a flight crew, flight crew members have needed to develop alternative solutions for creating a flyable trajectory or have had to manually intervene, taking them away from other tasks and reducing their awareness. A continuous and flyable trajectory presented to the flight crew can eliminate the need to develop alternative solutions or intervene manually.

In the current disclosure, reference is made to various aspects. However, it should be understood that the present disclosure is not limited to specific described aspects. Instead, any combination of the following features and elements, whether related to different aspects or not, is contemplated to implement and practice the teachings provided herein. Additionally, when elements of the aspects are described in the form of "at least one of A and B," it will be understood that aspects including element A exclusively, including element B exclusively, and including element A and B are each contemplated. Furthermore, although some aspects may achieve advantages over other possible solutions and/or over the prior art, whether or not a particular advantage is achieved by a given aspect is not limiting of the present disclosure. Thus, the aspects, features, aspects and advantages disclosed herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, aspects described herein may be embodied as a system, method or computer program product. Accordingly, aspects may take the form of an entirely hardware aspect, an entirely software aspect (including firmware, resident software, micro-code, etc.) or an aspect combining software and hardware aspects that may all generally be referred to herein as a "circuit," "module" or "system." Furthermore, aspects described herein may take the form of a computer program product embodied in one or more computer readable storage medium(s) having computer readable program code embodied thereon.

Program code embodied on a computer readable storage medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. Model-based development tools can also be used, such as Matlab/Simulink and the like. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described herein with reference to flowchart illustrations and/or block diagrams of methods, apparatuses (systems), and computer program products according to aspects of the present disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the block(s) of the flowchart illustrations and/or block diagrams.

These computer program instructions may also be stored in a computer readable medium that can direct a computer, other programmable data processing apparatus, or other device to function in a particular manner, such that the instructions stored in the computer readable medium produce an article of manufacture including instructions which implement the function/act specified in the block(s) of the flowchart illustrations and/or block diagrams.

The computer program instructions may also be loaded onto a computer, other programmable data processing apparatus, or other device to cause a series of operational steps to be performed on the computer, other programmable apparatus or other device to produce a computer implemented process such that the instructions which execute on the computer, other programmable data processing apparatus, or other device provide processes for implementing the functions/acts specified in the block(s) of the flowchart illustrations and/or block diagrams.

The flowchart illustrations and block diagrams in the Figures illustrate the architecture, functionality, and operation of possible implementations of systems, methods, and computer program products according to various aspects of the present disclosure. In this regard, each block in the flowchart illustrations or block diagrams may represent a module, segment, or portion of code, which includes one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order or out of order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

While the foregoing is directed to aspects of the present disclosure, other and further aspects of the disclosure may be devised without departing from the basic scope thereof, and the scope thereof is determined by the claims that follow.

What is claimed is:

1. A method, comprising:

tracking a position of an aircraft via a navigation system;

receiving instructions for the aircraft to join a holding pattern at an entry waypoint according to an entry trajectory profile;

identifying a discontinuity in the entry trajectory profile based on operational rules for the aircraft;

in response to identifying the discontinuity in the entry trajectory profile, building a modified entry trajectory profile for the aircraft to join the holding pattern at the entry waypoint so that at least one aspect of the modified entry trajectory profile is changed relative to the entry trajectory profile to provide a continuous entry transition to the entry waypoint that complies with the operational rules of the aircraft, an airspace around the holding pattern is divided into a plurality of sectors using the entry waypoint as a reference point, the modified entry trajectory profile is built by:

determining a sector from the plurality of sectors from which the aircraft would approach the entry waypoint with a current track angle of the aircraft moved to intersect the entry waypoint and with the aircraft pointing at the entry waypoint; and generating the modified entry trajectory profile based at least in part on the sector determined; and commanding, via a flight control system of the aircraft, the aircraft to join the holding pattern at the entry waypoint by flying according to the modified entry trajectory profile.

2. The method of claim 1, wherein the modified entry trajectory profile is generated so as to intersect the entry waypoint a single time with a last segment of the modified entry trajectory profile.

3. The method of claim 1, wherein the sector is determined independent of a sector of the plurality of sectors in which the aircraft is physically located.

4. The method of claim 1, wherein determining the sector from the plurality of sectors comprises:

translating the current track angle to the entry waypoint so as to render a translated track angle, the translated track angle intersects the entry waypoint and the aircraft points at the entry waypoint; and determining a course change angle based at least in part on the translated track angle and an inbound course of the holding pattern or an inbound reference line thereof, and wherein the sector is determined based at least in part on the course change angle.

5. The method of claim 4, wherein the sector is determined by correlating the course change angle to one of a plurality of predefined angle ranges, each predefined angle range of the plurality of predefined angles ranges corresponds to one of the plurality of sectors.

6. The method of claim 1, wherein when the sector is determined as a first sector of the plurality of sectors, the modified entry trajectory profile is generated so that:

i) a capture of the holding pattern is made at an inbound course of the holding pattern in a direction opposite to an inbound direction; and ii) a tear drop pattern is created that ends at the entry waypoint.

7. The method of claim 1, wherein the sector is determined as a first sector of the plurality of sectors, and wherein the method further comprises:

determining whether a capture of the holding pattern would be past a starting point of an inbound course of the holding pattern or a length of the inbound course of the holding pattern is shorter than two times a turn radius of turns of the holding pattern, and wherein when the capture of the holding pattern would be past the starting point of the inbound course of the holding pattern or the length of the inbound course of the holding pattern is shorter than two times the turn radius of the turns of the holding pattern, the modified entry trajectory profile is generated so that:

i) a capture is made past the starting point of the inbound course at an inbound reference line, which extends from and is coaxial with the inbound course, and in a direction opposite to an inbound direction; and ii) a tear drop pattern is created having a tear drop arc built beyond a turn-to-inbound course of the holding pattern, and the tear drop ends at the entry waypoint.

8. The method of claim 1, wherein when the sector is determined as a second, third, or fourth sector of the plurality of sectors, the modified entry trajectory profile is generated so that:

i) a capture of the holding pattern is made at an outbound course of the holding pattern in a direction with an outbound direction; and ii) a following pattern is created that follows the holding pattern and ends at the entry waypoint.

9. The method of claim 8, wherein the modified entry trajectory profile is generated so that, prior to the capture of the holding pattern at the outbound course, a segment of the modified entry trajectory profile crosses the outbound course.

10. The method of claim 1, wherein the sector is determined as a second, third, or fourth sector of the plurality of sectors, and wherein the method further comprises:

determining whether a capture of the holding pattern would be past an ending point of an outbound course of the holding pattern, and wherein when the capture of the holding pattern would be past the ending point of the outbound course of the holding pattern, the modified entry trajectory profile is generated so that:

i) a capture is made past the ending point of the outbound course at an outbound reference line, which extends from and is coaxial with the outbound course, and in a direction with an outbound direction; and ii) an extended following pattern is built having an arc segment and an inbound segment, the arc segment is built beyond a turn-to-inbound course of the holding pattern, and the inbound segment ends at the entry waypoint.

11. The method of claim 1, wherein building the modified entry trajectory profile further comprises:

determining a build construction based at least in part on the sector determined, the build construction being determined from one of a plurality of possible build constructions, and wherein the modified entry trajectory profile is built in accordance with the build construction.

12. The method of claim 11, further comprising:

determining an implementation scheme for the build construction, the implementation scheme being determined from one of a plurality of possible implementation schemes that includes at least a normal capture implementation and an extended capture implementation.

13. A non-transitory, computer readable medium comprising instructions that, when executed by one or more processors, cause the one or more processors to perform an operation, the operation comprising:

tracking a position of an aircraft via a navigation system;

receiving instructions for the aircraft to join a holding pattern at an entry waypoint according to an entry trajectory profile;

identifying a discontinuity in the entry trajectory profile based on operational rules for the aircraft;

in response to identifying the discontinuity in the entry trajectory profile, building a modified entry trajectory profile for the aircraft to join the holding pattern at the entry waypoint so that at least one aspect of the modified entry trajectory profile is changed relative to the entry trajectory profile to provide a continuous entry transition to the entry waypoint that complies with the operational rules of the aircraft, an airspace around the holding pattern is divided into a plurality of sectors using the entry waypoint as a reference point, the modified entry trajectory profile is built by:

determining a sector from the plurality of sectors from which the aircraft would approach the entry waypoint with a current track angle of the aircraft moved to intersect the entry waypoint and with the aircraft pointing at the entry waypoint; and generating the modified entry trajectory profile based at least in part on the sector determined; and commanding, via a flight control system of the aircraft, the aircraft to join the holding pattern at the entry waypoint by flying according to the modified entry trajectory profile.

14. The non-transitory, computer readable medium of claim 13, wherein determining the sector from the plurality of sectors comprises:

translating the current track angle to the entry waypoint so as to render a translated track angle, the translated track angle intersects the entry waypoint and the aircraft points at the entry waypoint; and determining a course change angle based at least in part on the translated track angle and an inbound course of the holding pattern, and wherein the sector is determined based at least in part on the course change angle.

15. The non-transitory, computer readable medium of claim 13, wherein the plurality of sectors include a first sector, a second sector, a third sector, and a fourth sector, and wherein when the sector is determined as a first sector of the plurality of sectors, the modified entry trajectory profile is generated so that:

i) a capture of the holding pattern is made at an inbound course of the holding pattern in a direction opposite to an inbound direction; and ii) a tear drop pattern is created that ends at the entry waypoint.

16. The non-transitory, computer readable medium of claim 13, wherein the plurality of sectors include a first sector, a second sector, a third sector, and a fourth sector, and wherein when the sector is determined as a second, third, or fourth sector of the plurality of sectors, the modified entry trajectory profile is generated so that:

i) a capture of the holding pattern is made at an outbound course of the holding pattern in a direction with an outbound direction; and ii) a following pattern is created that follows the holding pattern and ends at the entry waypoint.

17. An aircraft, comprising:

a system having one or more processors and one or more memory devices that store a program executable by the one or more processors to perform an operation, the operation comprising:

tracking a position of the aircraft via a navigation system;

receiving instructions for the aircraft to join a holding pattern at an entry waypoint according to an entry trajectory profile;

identifying a discontinuity in the entry trajectory profile based on operational rules for the aircraft;

in response to identifying the discontinuity in the entry trajectory profile, building a modified entry trajectory profile for the aircraft to join the holding pattern at the entry waypoint so that at least one aspect of the modified entry trajectory profile is changed relative to the entry trajectory profile to provide a continuous entry transition to the entry waypoint that complies with the operation rules of the aircraft by:

determining a sector from a plurality of sectors from which the aircraft would approach the entry waypoint of the holding pattern with a current track angle of the aircraft moved to intersect the entry waypoint and with the aircraft pointing at the entry waypoint; and generating the modified entry trajectory profile based at least in part on the sector determined; and commanding, via a flight control system of the aircraft, the aircraft to join the holding pattern at the entry waypoint by flying according to the modified entry trajectory profile.

18. The method of claim 1, wherein the operational rules set forth constraints for specified turn radii of the aircraft at different aircraft speeds.

19. The non-transitory, computer readable medium of claim 13, wherein the operational rules set forth constraints for specified turn radii of the aircraft at different aircraft speeds.

20. The aircraft of claim 17, wherein the operational rules set forth constraints for specified turn radii of the aircraft at different aircraft speeds.

* * * * *